(12) United States Patent
Kobayashi et al.

(10) Patent No.: US 7,543,513 B2
(45) Date of Patent: Jun. 9, 2009

(54) HONEYCOMB STRUCTURE MOUNTING BASE AND HONEYCOMB STRUCTURE INSPECTION APPARATUS

(75) Inventors: Hiroyuki Kobayashi, Ibi-gun (JP); Junji Furuya, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 102 days.

(21) Appl. No.: 11/867,256

(22) Filed: Oct. 4, 2007

(65) Prior Publication Data
US 2008/0237428 A1 Oct. 2, 2008

(30) Foreign Application Priority Data
Oct. 16, 2006 (WO) ................. PCT/JP2006/320597

(51) Int. Cl.
*G01N 19/00* (2006.01)
(52) U.S. Cl. .................................................. 73/865.9
(58) Field of Classification Search .................. 73/40.7, 73/865.8, 865.9, 432.1
See application file for complete search history.

(56) References Cited

U.S. PATENT DOCUMENTS

| 4,298,285 | A | 11/1981 | Ito ............................ 356/612 |
| 7,043,964 | B1 * | 5/2006 | Hickman .................... 73/40.7 |
| 2004/0007077 | A1 | 1/2004 | Hijikata ...................... 73/799 |

2004/0194427 A1 10/2004 Ishii et al. ................... 52/782.1

FOREIGN PATENT DOCUMENTS

| GB | 2030286 | 4/1980 |
| JP | 55-037919 | 3/1980 |
| JP | 01-059033 | 3/1989 |
| JP | 2004-045276 | 2/2004 |
| JP | 2004-151078 | 5/2004 |
| JP | 2004151078 A * | 5/2004 |

* cited by examiner

*Primary Examiner*—Hezron Williams
*Assistant Examiner*—Tamiko D Bellamy
(74) *Attorney, Agent, or Firm*—Ditthavong Mori & Steiner, P.C.

(57) ABSTRACT

A honeycomb structure mounting base includes a mounting member having a structure mounting surface configured to contact an entire end face of a honeycomb structure including a periphery of the honeycomb structure; a preliminary mounting member having a preliminary mounting surface configured to have the honeycomb structure placed thereon before placement of the honeycomb structure on the mounting member; and an elevating mechanism configured to move the preliminary mounting member up and down in relation to the mounting member. The preliminary mounting surface is parallel to the structure mounting surface. The preliminary mounting surface has a shape allowing an entire periphery of the preliminary mounting surface to exist inside a periphery of the end face of the honeycomb structure in a case of superimposing the preliminary mounting surface onto an end face of the honeycomb structure.

25 Claims, 11 Drawing Sheets

(a)

(b)

(a)

(b)

(a)

(b)

(a)

(b)

(a)

(b)

(c)

A-A line cross-sectional view

US 7,543,513 B2

HONEYCOMB STRUCTURE MOUNTING BASE AND HONEYCOMB STRUCTURE INSPECTION APPARATUS

CROSS-REFERENCE TO RELATED APPLICATIONS

The present application claims priority under 35 U.S.C. §119 to PCT Application No. PCT/JP2006/320597, filed on Oct. 16, 2006. The contents of this application are incorporated herein by reference in their entirety.

BACKGROUND OF THE INVENTION

1. Field of the Invention

The present invention relates to a honeycomb structure mounting base, and a honeycomb structure inspection apparatus.

2. Discussion of the Background

Harm to the environment and the human body caused by particles such as soot contained in exhaust gas discharged from the internal combustion engines of buses, trucks and other vehicles, construction equipment and the like has recently become a problem. For that reason, there have been currently proposed numerous kinds of honeycomb filters using a honeycomb structure of porous ceramic as a filter for capturing particles contained in exhaust gas, thereby purifying the exhaust gas.

Conventionally, when manufacturing a honeycomb structure, for example, first, a ceramic powder, a binder, a liquid dispersal medium, and the like are blended to prepare a wet mixture. Using a die, the wet mixture is continuously extrusion molded, and the extruded molded body is then cut to a prescribed length to manufacture a pillar-shaped honeycomb molded body.

Next, the honeycomb molded body obtained above is dried. Afterward, a plug material paste is charged into either end of prescribed cells and sealed in order to achieve a sealed state of the cells. After the sealed state has been achieved, degreasing and firing treatment is carried out, thus the honeycomb fired body is manufactured.

Afterward, a sealing material paste is applied onto the side faces of the honeycomb fired body, and the honeycomb fired bodies are bonded together. This state of a multitude of the honeycomb fired bodies being combined with one another by interposing a sealing material layer (an adhesive layer) effectuates an aggregate of honeycomb fired bodies. Excision is then carried out on the achieved aggregate of honeycomb fired bodies using a cutting machine or the like to achieve a ceramic block of a prescribed form, such as a round pillar or cylindroid form. Finally, a sealing material paste is applied on the periphery of the ceramic block to form a sealing material layer (a coat layer), thereby concluding the manufacture of the honeycomb structure.

The honeycomb structure of the sort described herein above (ceramic filters or catalyst supporting carrier) is normally stored within a casing for use. Because of this, before storing the honeycomb structure within the casing, it is necessary to inspect whether or not the manufactured honeycomb structure has the prescribed shape fitting to the above-mentioned casing. In this inspection, the honeycomb structure is placed on a mounting base provided on an inspection apparatus.

It is also necessary to inspect whether or not the above-described honeycomb structure contains internal defects in order to make use of specific functions of the honeycomb structure. In this inspection as well, the honeycomb structure is placed on a mounting base provided on an inspection apparatus.

Here, an apparatus using a collimated beam, for example, is proposed (see, for example, Japanese Unexamined Patent Application No. 55-37919 A) as an apparatus for inspecting the external shape of a manufactured honeycomb structure. Japanese Unexamined Patent Application No. 55-37919 A discloses a turn table, which is a table on which a honeycomb structure is to be placed when inspecting an external shape thereof. Also, an apparatus using transmitted acoustic signal information, for example, is proposed (see, for example, Japanese Unexamined Patent Application No. 2004-151078 A) as an apparatus for inspecting defects of a manufactured honeycomb structure. Japanese Unexamined Patent Application No. 2004-151078 A discloses a rotating table, which is a table on which a honeycomb structure is to be placed when inspecting defects thereof. The contents of Japanese Unexamined Patent Application Nos. 55-37919 A and 2004-151078 A are incorporated herein by reference in their entirety.

SUMMARY OF THE INVENTION

A honeycomb structure mounting base of the present invention includes a mounting member having a structure mounting surface configured to contact an entire end face of a honeycomb structure including a periphery of the honeycomb structure; a preliminary mounting member having a preliminary mounting surface configured to have the honeycomb structure placed thereon before placement of the honeycomb structure on the mounting member; and an elevating mechanism configured to move the preliminary mounting member up and down in relation to the mounting member. The preliminary mounting surface is parallel to the structure mounting surface. The preliminary mounting surface has a shape allowing an entire periphery of the preliminary mounting surface to exist inside a periphery of the end face of the honeycomb structure in a case of superimposing the preliminary mounting surface onto an end face of the honeycomb structure.

In the honeycomb structure mounting base of the present invention, desirably, the honeycomb structure is supported on the preliminary mounting surface positioned higher than the structure mounting surface, the honeycomb structure is placed on the structure mounting surface by the elevating mechanism lowering the preliminary mounting surface to at least a position of the structure mounting surface, and the preliminary mounting surface is once again raised to a position at least higher than the structure mounting surface by using the elevating mechanism, with the preliminary mounting surface not supporting the honeycomb structure.

In addition, the honeycomb structure mounting base of the present invention, desirably, the end face shape of the honeycomb structure and the peripheral shape of the preliminary mounting surface are similar to one another.

In addition, the honeycomb structure mounting base of the present invention, desirably, the preliminary mounting surface is donut-shaped, and the structure mounting surface is also disposed in a central portion of the preliminary mounting surface.

In addition, desirably, the honeycomb structure mounting base of the present invention, further includes a leg portion attached to a lower portion of the preliminary mounting surface in a radial direction and at equal intervals centered around a center of gravity of the preliminary mounting surface; wherein the preliminary mounting member is configured to be moved up and down with the leg portion running in conjunction with the elevating mechanism.

In addition, desirably, the honeycomb structure mounting base further includes a rotating table at a bottom of the honeycomb structure mounting base.

In addition, desirably, the honeycomb structure mounting base is utilized in an inspection apparatus configured to conduct inspection of at least one of an internal shape and an external shape of the honeycomb structure during or after a manufacturing process of the honeycomb structure, or in an evaluation apparatus configured to conduct evaluation of a function of at least one of the honeycomb structure having a catalyst and the honeycomb structure not having a catalyst.

A honeycomb structure inspection apparatus of the present invention includes a honeycomb structure mounting base that includes a mounting member having a structure mounting surface configured to contact an entire end face of a honeycomb structure including a periphery of the honeycomb structure; a preliminary mounting member having a preliminary mounting surface configured to have the honeycomb structure placed thereon before placement of the honeycomb structure on the mounting member; and an elevating mechanism configured to move the preliminary mounting member up and down in relation to the mounting member. The honeycomb structure inspection apparatus further includes an inspection device configured to conduct inspection of at least one of an external shape and an internal shape of the honeycomb structure placed on the mounting member. The preliminary mounting surface is parallel to the structure mounting surface. The preliminary mounting surface has a shape allowing an entire periphery of the preliminary mounting surface to exist inside a periphery of the end face of the honeycomb structure in a case of superimposing the preliminary mounting surface onto an end face of the honeycomb structure.

In addition, in the honeycomb structure inspection apparatus of the present invention, desirably, the honeycomb structure is supported on the preliminary mounting surface positioned higher than the structure mounting surface, the honeycomb structure is placed on the structure mounting surface by the elevating mechanism lowering the preliminary mounting surface to at least a position of the structure mounting surface, and the preliminary mounting surface is once again raised to a position at least higher than the structure mounting surface by using the elevating mechanism, with the preliminary mounting surface not supporting the honeycomb structure.

In addition, in the honeycomb structure inspection apparatus of the present invention, desirably, the end face shape of the honeycomb structure and the peripheral shape of the preliminary mounting surface are similar to one another.

In addition, in the honeycomb structure inspection apparatus of the present invention, desirably, the preliminary mounting surface is donut-shaped, and the structure mounting surface is also disposed in a central portion of the preliminary mounting surface.

The honeycomb structure inspection apparatus of the present invention, desirably, further includes a leg portion attached to an lower portion of the preliminary mounting surface in a radial direction and at equal intervals centered around a center of gravity of the preliminary mounting surface, wherein the preliminary mounting member is configured to be moved up and down with the leg portion running in conjunction with the elevating mechanism.

In the honeycomb structure inspection apparatus of the present invention, the inspection device is desirably configured to conduct inspection of the external shape of the honeycomb structure, and the external shape includes at least one property selected from the group consisting of: length in a longitudinal direction, a maximum diameter, a degree of roundness, a degree of squareness, a degree of parallelism, and a degree of position, of the honeycomb structure.

The inspection device of the honeycomb structure inspection apparatus is desirably configured to conduct inspection of one of the external shape and the internal shape of the honeycomb structure. The inspection device desirably includes at least one of a shape inspection apparatus employing a laser light or a contact probe; and a defect inspection apparatus employing thermal imaging or penetrant inspection techniques.

The shape inspection apparatus employing a laser light desirably includes a honeycomb structure mounting base; at least two laser irradiation apparatuses each having a light source; at least two laser receiving apparatuses each having a light receiving portion to receive a light from the light source; and a support member which is configured to support the laser irradiation apparatuses and the laser receiving apparatuses on the honeycomb structure mounting base. The honeycomb structure mounting base is configured to place the honeycomb structure and between the irradiation apparatuses and the laser receiving apparatuses.

The honeycomb structure mounting base of the honeycomb structure inspection apparatus desirably includes a rotating table which is configured to rotate the mounting member and the preliminary mounting member. The honeycomb structure inspection apparatus is configured to conduct an inspection with rotating the honeycomb structure intermittently and changing a height at a portion to be inspected.

The shape inspection apparatus employing a contact probe desirably includes a disc; a multitude of approximately bar-shaped contact probes which are provided on a bottom face of the disc; and a connector portion which supports the disc and is connected to the disc for sending data from the contact probes.

The defect inspection apparatus employing thermal imaging technique desirably includes a mechanism configured to apply a thermal field to the honeycomb structure; and a thermography configured to measure and display a thermal distribution on the honeycomb structure.

The defect inspection apparatus employing penetrant inspection techniques is desirably configured to conduct at least one of a dye penetrant inspection and a fluorescent penetrant inspection. The defect inspection apparatus desirably includes a liquid penetrant supply mechanism, a liquid penetrant remove mechanism, and a liquid developer supply mechanism. The defect inspection apparatus further desirably includes an excitation light source.

The inspection device is desirably configured to conduct an inspection of the internal shape of the honeycomb structure by employing an acoustic signal technique.

The inspection device desirably includes a transmitting probe configured to launch an acoustic signal into the honeycomb structure; a receiving probe configured to receive an acoustic signal which is transmitted through the honeycomb structure; and an information processing apparatus configured to determine a presence of a defect based on information processing of the acoustic signal received via the receiving probe.

The honeycomb structure inspection apparatus desirably is utilized as an inspection apparatus configured to conduct inspection of at least one of the internal shape and the external shape of the honeycomb structure during or after a manufacturing process of the honeycomb structure, or as an evaluation apparatus configured to conduct evaluation of a function of at least one of the honeycomb structure having a catalyst and the honeycomb structure not having a catalyst.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 1(a) illustrates a state in which a honeycomb structure is supported on the preliminary mounting surface positioned higher than a structure mounting surface, and FIG. 1(b) illustrates a state in which the preliminary mounting surface is positioned lower than the structure mounting surface and the honeycomb structure is placed on the structure mounting surface.

FIG. 2(a) illustrates a state in which a honeycomb structure is supported on the preliminary mounting surface positioned higher than a structure mounting surface, and FIG. 2(b) illustrates a state in which the preliminary mounting surface is positioned lower than the structure mounting surface and the honeycomb structure is placed on the structure mounting surface.

FIGS. 3(a) and 3(b) illustrate a state in which a preliminary mounting surface is positioned higher than a structure mounting surface.

FIG. 10(b) is a front view illustrating a state in which an external shape of a honeycomb structure is actually inspected.

DESCRIPTION OF THE EMBODIMENTS

Figure 1:
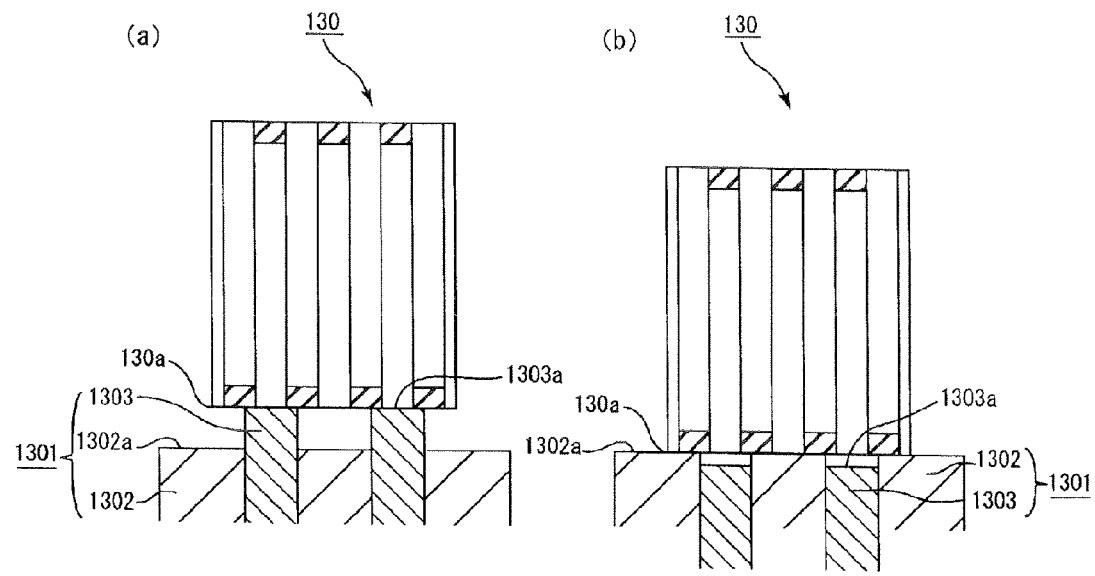
FIGS. 1(a) and 1(b) are cross-sectional views schematically illustrating a way in which a honeycomb structure is placed on the honeycomb structure mounting base according to the embodiment of the present invention with a donut-shaped preliminary mounting surface.

The embodiments will now be described with reference to the accompanying drawings, wherein like reference numerals designate corresponding or identical elements throughout the various drawings.

The honeycomb structure mounting base according to the embodiment of the present invention includes a mounting member having a structure mounting surface configured to contact an entire end face of a honeycomb structure including a periphery of the honeycomb structure; a preliminary mounting member having a preliminary mounting surface configured to have the honeycomb structure placed thereon before placement of the honeycomb structure on the mounting member; and an elevating mechanism configured to move the preliminary mounting member up and down in relation to the mounting member. The preliminary mounting surface is parallel to the structure mounting surface. The preliminary mounting surface has a shape allowing an entire periphery of the preliminary mounting surface to exist inside a periphery of the end face of the honeycomb structure in a case of superimposing the preliminary mounting surface onto an end face of the honeycomb structure.

Since the honeycomb structure mounting base according to the embodiment of the present invention includes a preliminary mounting member having a preliminary mounting surface, and the preliminary mounting surface has a shape allowing the entire periphery of the honeycomb structure to exist inside the periphery of the honeycomb structure in a case of superimposing the preliminary mounting surface onto an end face of the honeycomb structure, it is possible to support a honeycomb structure, with the preliminary mounting surface positioned higher than the structure mounting surface, in such a manner that the entirety of the preliminary mounting surface is positioned inside the periphery of the end face of the honeycomb structure without contacting the periphery of the end face of the honeycomb structure.

Also, the preliminary mounting surface has a plane that is parallel with respect to the structure mounting surface. Because of this, it is possible, by adjusting the heights of the preliminary mounting surface and the structure mounting surface, to contact the periphery of the end face of the honeycomb structure with the structure mounting surface without putting the periphery of the end face of the honeycomb structure under strong shock.

Also, since the structure mounting surface is shaped to contact the entirety of the periphery of the end face of the honeycomb structure, it becomes easy to place the honeycomb structure on the structure mounting surface in a stable manner.

Therefore, according to the honeycomb structure mounting base of the embodiment of the present invention, it becomes easy to place a honeycomb structure on the structure mounting surface in a stable manner and without generating chipping, cracking, or the like on the periphery of the end face of the honeycomb structure.

The honeycomb structure inspection apparatus according to the embodiment of the present invention includes a mounting member having a structure mounting surface configured to contact an entire end face of a honeycomb structure including a periphery of the honeycomb structure; a preliminary mounting member having a preliminary mounting surface configured to have the honeycomb structure placed thereon before placement of the honeycomb structure on the mounting member; an elevating mechanism configured to move the preliminary mounting member up and down in relation to the mounting member; and an inspection device configured to conduct inspection of at least one of an external shape and an internal shape of the honeycomb structure placed on the mounting member. The preliminary mounting surface is parallel to the structure mounting surface. The preliminary mounting surface has a shape allowing an entire periphery of the preliminary mounting surface to exist inside a periphery of the end face of the honeycomb structure in a case of superimposing the preliminary mounting surface onto an end face of the honeycomb structure.

Since the honeycomb structure inspection apparatus according to the embodiment of the present invention includes the honeycomb structure mounting base according to the embodiment of the present invention, when placing a honeycomb structure on the honeycomb structure inspection apparatus, it is possible to place a honeycomb structure on the structure mounting surface by contacting the periphery of the end face of the honeycomb structure with the structure mounting surface without putting the periphery of the end face of the honeycomb structure under strong shock.

Therefore, according to the honeycomb structure inspection apparatus of the embodiment of the present invention, it becomes easy to place a honeycomb structure on the structure mounting surface in a stable manner and without generating chipping, cracking, or the like on the periphery of the end face of the honeycomb structure.

The turn table and rotating table disclosed in Japanese Unexamined Patent Application Nos. 55-37919 A and 2004-151078 A are flat plate-shaped tables, and up until now, honeycomb structures have been placed on such tables with an end face of the honeycomb structure on the flat plate-shaped table.

Figure 13:
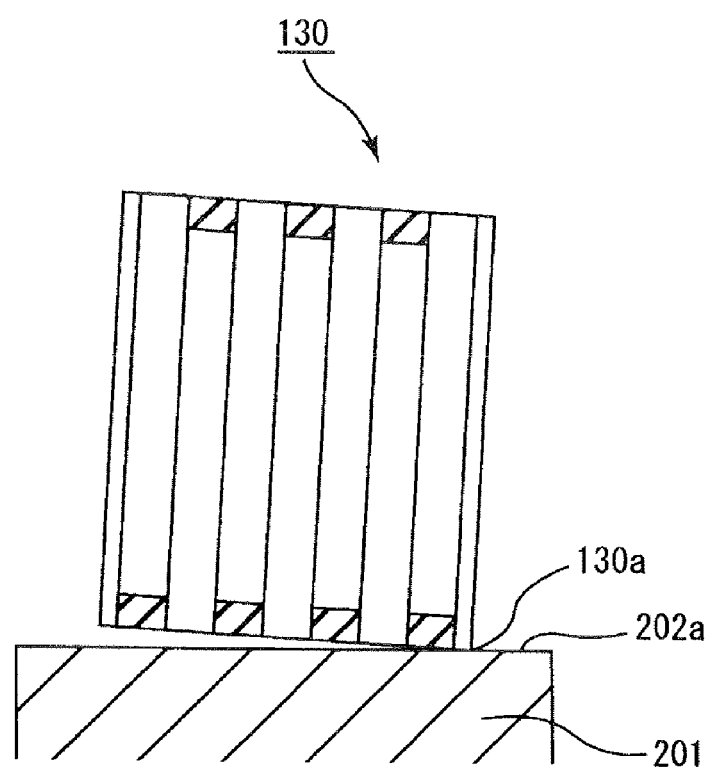
FIG. 13 is a cross-sectional view schematically illustrating a conventional way in which a honeycomb structure is placed on a flat plate-shaped table.

FIG. 13 is a cross-sectional view schematically illustrating a conventional way in which a conventional honeycomb structure is placed on a flat plate-shaped table.

When placing a honeycomb structure 130 on a flat plate-shaped table 201 illustrated in FIG. 13, in the case where the end face of the honeycomb structure 130 is not parallel with a top face 202a of the flat plate-shaped table 201, an peripheral portion 130a (hereinafter also termed 'periphery of the end face' for simplicity) of the honeycomb structure 130 will initially come into contact with the top face 202a of the flat plate-shaped table 201 at one point.

Therefore, since the honeycomb structure includes the brittle material ceramic, when the periphery of the end face 130a makes contact at one point with the top face 202a of the flat plate-shaped table 201, there may arise instances of chipping, cracking, and the like being generated on the peripheral portion 130a due to the shock of the contact. Consequently, there was a problem in which honeycomb structures became unusable as product due to such occurrences of chipping, cracking, and the like.

Also, chipping, cracking, and the like on the periphery of the end face is not only generated when a honeycomb structure is placed in the manner mentioned above on a table provided on an inspection apparatus, but also occurs generally when a honeycomb structure is placed on a flat plate-shaped table. Because of this, there was need of a mounting base on which a honeycomb structure may be placed without occurrences of chipping, cracking, or the like on the periphery of the end face of the honeycomb structure.

The embodiment of the present invention provides a honeycomb structure mounting base capable of having a honeycomb structure placed thereon without chipping, cracking, or the like being generated on the periphery of the end face of the honeycomb molded body, and, a honeycomb structure inspection apparatus capable of conducting inspection of a honeycomb structure without occurrences of chipping, cracking, or the like on the periphery of the end face of the honeycomb structure.

Here, description will first be given in regard to the summary of placing the honeycomb structure on the honeycomb structure mounting base according to the embodiment of the present invention. After this, a description will then be given in regard to a specific example of the honeycomb structure mounting base according to the embodiment of the present invention.

Here, in the present specification, in any of modes of the honeycomb molded body, the honeycomb fired body and the honeycomb structure, among the faces forming the respective external shapes, those faces to which cells are exposed are referred to as end faces, and those faces other than the end faces are referred to as side faces.

FIGS. 1(a) and 1(b) are cross-sectional views schematically illustrating a way in which a honeycomb structure is placed on the honeycomb structure mounting base according to the embodiment of the present invention with a donut-shaped preliminary mounting surface, FIG. 1(a) illustrates a state in which a honeycomb structure is supported on the preliminary mounting surface positioned higher than a structure mounting surface, and FIG. 1(b) illustrates a state in which the preliminary mounting surface is positioned lower than the structure mounting surface and the honeycomb structure is placed on the structure mounting surface.

In order to place the honeycomb structure on a honeycomb structure mounting base 1301 according to the embodiment of the present invention, first, a preliminary mounting surface 1303a is positioned higher than a structure mounting surface 1302a.

Next, a honeycomb structure 130 is supported on the preliminary mounting surface 1303a in this state (see FIG. 1(a)). At this time, the honeycomb structure 130 is supported on the preliminary mounting surface 1303a in such a manner that the entirety of the preliminary mounting surface 1303a exists inside the periphery of the end face of the honeycomb structure 130. By supporting the honeycomb structure 130 in this manner, it becomes easy to prevent the periphery of the end face 130a of the honeycomb structure from contacting the preliminary mounting surface 1303a and thereby avoid the generation of chipping, cracking, or the like on the periphery of the end face of the honeycomb structure.

Also, since the preliminary mounting surface 1303a is donut-shaped in the honeycomb structure mounting base 1301, the preliminary mounting surface 1303a does not support the central portion of the end face of the honeycomb structure 130.

Next, a preliminary mounting member 1303 supporting the honeycomb structure 130 is moved from the position illustrated in FIG. 1(a) to the position illustrated in FIG. 1(b) by an elevating mechanism not illustrated.

More specifically, the preliminary mounting member 1303 is lowered in order that the preliminary mounting surface 1303a positioned higher than the structure mounting surface 1302a may be positioned lower than the structure mounting surface 1302a.

By lowering the preliminary mounting surface 1303a in this manner, the honeycomb structure 130 will be placed on the structure mounting surface 1302a of the mounting member 1302.

And the lowering of the preliminary mounting surface 1303a may be carried out to the position where the preliminary mounting surface 1303a occupies the same plane as the structure mounting surface 1302a.

At this time, since the preliminary mounting surface 1303a and the structure mounting surface 1302a are the parallel planes, the honeycomb structure 130 is lowered with the end face thereof being positioned parallel with respect to the structure mounting surface 1302a. So, when the preliminary mounting surface 1303a is lowered to the position where it would occupy the same plane as the structure mounting surface 1302a, since the structure mounting surface 1302a has a shape configured to contact the entire periphery of the end face of the honeycomb structure 130, the entire end face (excluding the portion contacting the preliminary mounting surface 1303a) of the honeycomb structure 130, which includes the periphery of the end face 130a, contacts the structure mounting surface 1302a simultaneously.

As a result, the honeycomb structure 130 is placed on the structure mounting surface 1302a in a stable manner without putting the periphery of the end face 130a of the honeycomb structure 130 under strong shock and without generation of chipping, cracking, or the like on the periphery of the end face 130a (see FIG. 1(b)).

And in the honeycomb structure mounting base 1301, since the structure mounting surface 1302a is disposed also inside the preliminary mounting surface 1303a, the central portion of the end face of the honeycomb structure 130 is also placed on the structure mounting surface 1302a. As a result, the honeycomb structure 130 is placed on the structure mounting surface 1302a in a highly stable manner.

Figure 2:
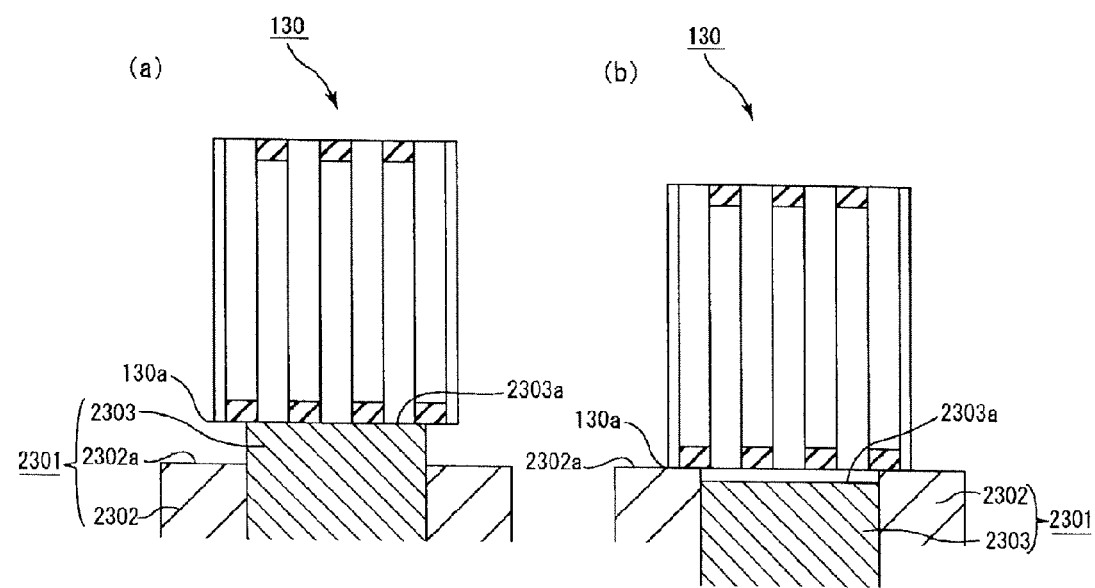
FIGS. 2(a) and 2(b) are cross-sectional views schematically illustrating a way in which a honeycomb structure is placed on a honeycomb structure mounting base according to the embodiment of the present invention with a circular preliminary mounting surface.

FIGS. 2(a) and 2(b) are cross-sectional views schematically illustrating a way in which a honeycomb structure is placed on a honeycomb structure mounting base according to the embodiment of the present invention with a circular preliminary mounting surface, FIG. 2(a) illustrates a state in which a honeycomb structure is supported on the preliminary mounting surface positioned higher than a structure mounting surface, and FIG. 2(b) illustrates a state in which the preliminary mounting surface is positioned lower than the structure mounting surface and the honeycomb structure is placed on the structure mounting surface.

Even in a case of placing the honeycomb structure using a honeycomb structure mounting base 2301 illustrated in FIGS. 2(a) and 2(b), the honeycomb structure 130 is first supported on a preliminary mounting surface 2303a as illustrated in FIG. 2(a) in the same manner as in the case using the honeycomb structure mounting base 1301 illustrated in FIGS. 1(a) and 1(b). At this time, the honeycomb structure is supported on the preliminary mounting surface 2303a in such a manner that the entirety of the preliminary mounting surface 2303a exists inside the periphery of the end face of the honeycomb structure 130. Next, by moving to a position illustrated in FIG. 2(b), the honeycomb structure 130 will be placed on a structure mounting surface 2302a of a mounting member 2302.

Since the preliminary mounting surface 2303a and the structure mounting surface 2302a are parallel flat planes in the case illustrated in FIGS. 2(a) and 2(b) as well, the entire end face (excluding the portion contacting the preliminary mounting surface 2303a) of the honeycomb structure 130 contacts the structure mounting surface 2302a simultaneously.

As a result, the honeycomb structure 130 is placed on the structure mounting surface 2302a in a stable manner without putting the periphery of the end face 130a of the honeycomb structure 130 under strong shock and without generation of chipping, cracking, or the like on the periphery of the end 130a.

Since the preliminary mounting surface 2303a illustrated in FIGS. 2(a) and 2(b) is circular, in the state illustrated in FIG. 2(a), the preliminary mounting surface 2303a supports a portion of the honeycomb structure 130 also including the central portion of the end face of the honeycomb structure 130, and in the state illustrated in FIG. 2(b), the central portion of the end face of the honeycomb structure 130 is not placed on the structure mounting surface 2302a, as only the peripheral portion of the honeycomb structure 130 is placed on the structure mounting surface 2302a. In this sort of state as well, the honeycomb structure 130 will be placed on the structure mounting surface 2302a in a stable manner.

Next, description will be given in regard to a specific example of the honeycomb structure mounting base according to the embodiment of the present invention with reference to the drawings.

Figure 3:
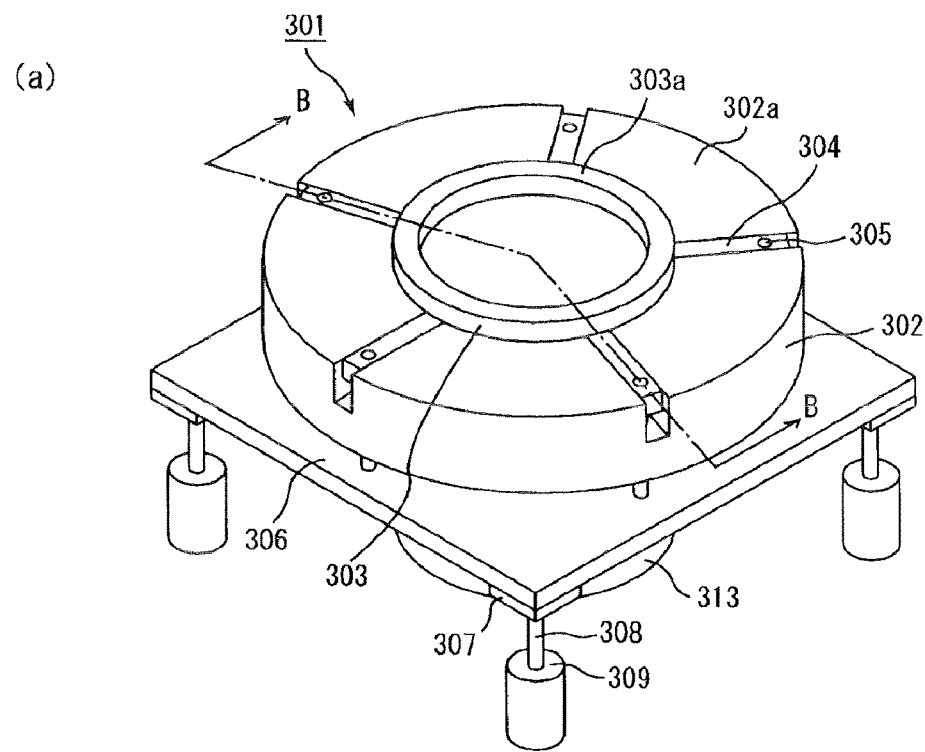
FIG. 3(a) is a perspective view schematically illustrating an example of a honeycomb structure mounting base according to the embodiment of the present invention.
FIG. 3(b) is a cross-sectional view taken along line B-B of the honeycomb structure mounting base illustrated in FIG. 3(a). Moreover.
Figure 3:
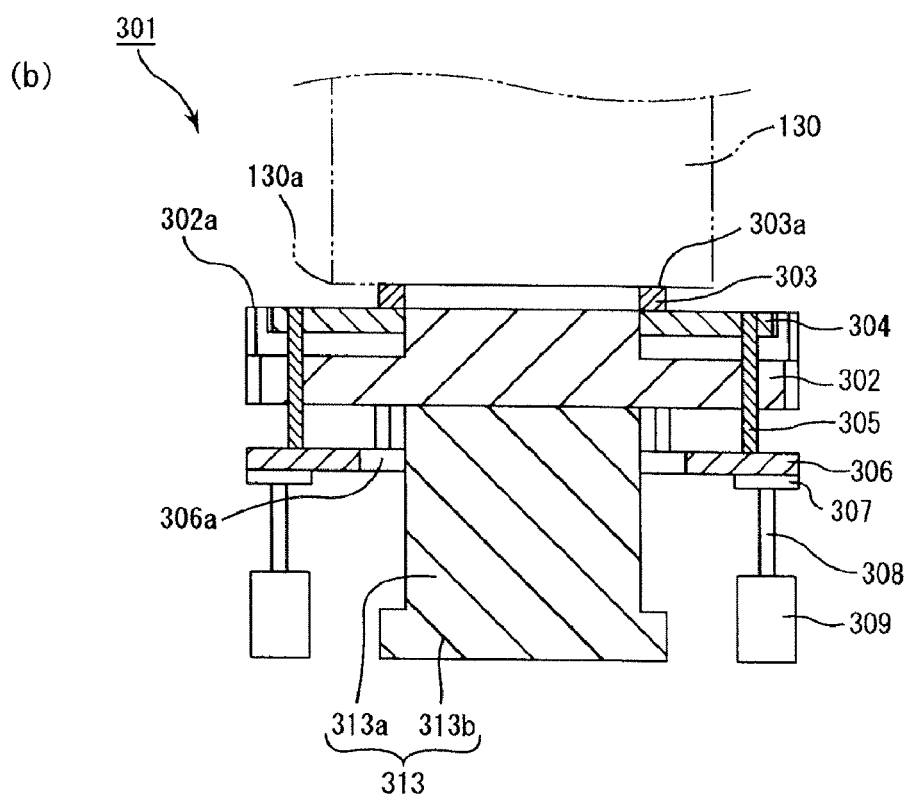

FIG. 3(a) is a perspective view schematically illustrating an example of a honeycomb structure mounting base according to the embodiment of the present invention, and FIG. 3(b) is a cross-sectional view taken along line B-B of the honeycomb structure mounting base illustrated in FIG. 3(a). Moreover, FIGS. 3(a) and 3(b) illustrate a state in which a preliminary mounting surface is positioned higher than a structure mounting surface.

Figure 4:
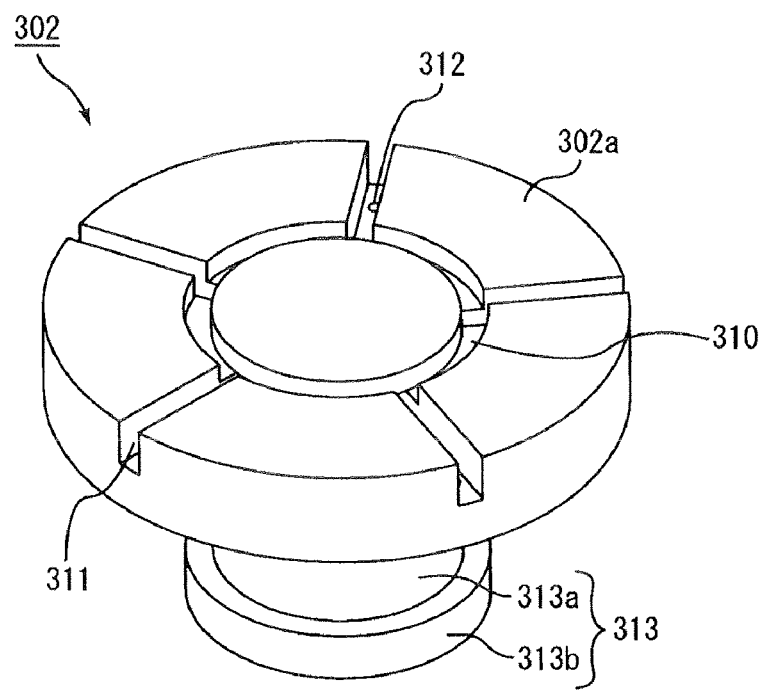
FIG. 4 is a perspective view illustrating a mounting member configuring the honeycomb structure mounting base illustrated in FIGS. 3(a) and 3(b).

FIG. 4 is a perspective view illustrating a mounting member configuring the honeycomb structure mounting base illustrated in FIGS. 3(a) and 3(b).

Figure 5:
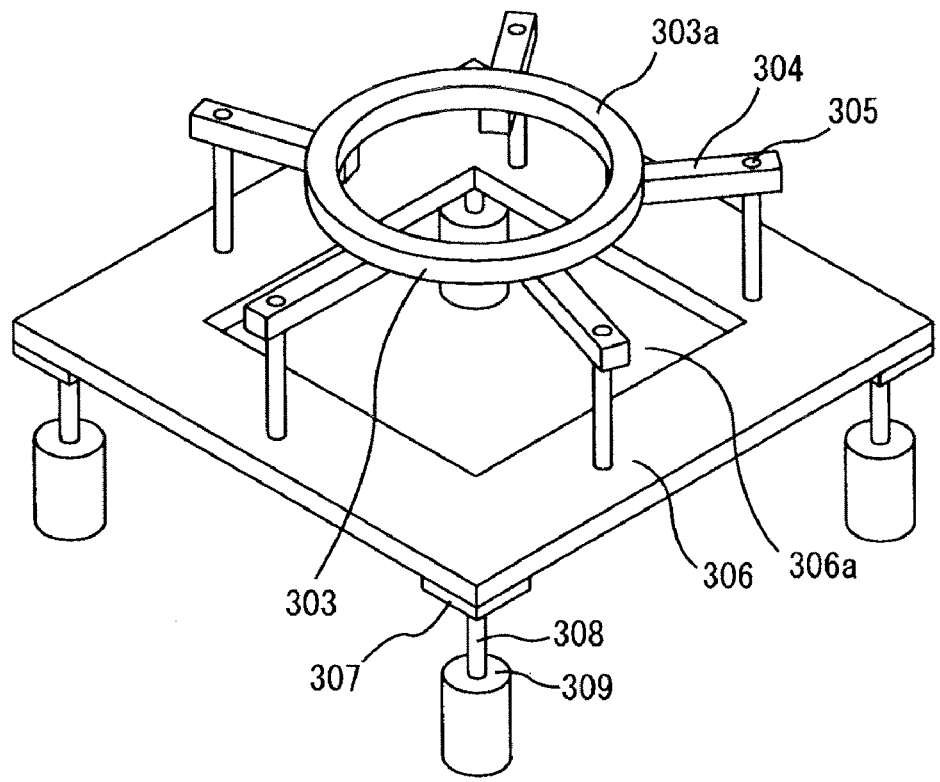
FIG. 5 is a perspective view illustrating a preliminary mounting member and an elevating mechanism each configuring the honeycomb structure mounting base illustrated in FIGS. 3(a) and 3(b).

FIG. 5 is a perspective view illustrating a preliminary mounting member and an elevating mechanism each configuring the honeycomb structure mounting base illustrated in FIGS. 3(a) and 3(b).

Also, in the FIG. 3(a), the honeycomb structure is illustrated twice with a dashed and dotted line.

At this point, description will be given in regard to the honeycomb structure mounting base citing a case of placing the honeycomb structure 130 illustrated in FIG. 11 as an example.

A honeycomb structure mounting base 301 includes a mounting member 302 having a structure mounting surface 302a configured to contact the entire periphery of the end face of the honeycomb structure, a preliminary mounting member 303 having a preliminary mounting surface 303a configured to support the honeycomb structure, and an elevating mechanism configured by a shaft 305, a metal plate 306, a cylinder plate 307, and an air cylinder 309, for raising and lowering the preliminary mounting member 303.

Also, the preliminary mounting member 303 and the elevating mechanism are joined by a leg portion 304 interposed therethrough.

As illustrated in FIG. 4, the mounting member 302 has a circular plate-shaped contour, and a groove portion for a preliminary mounting member 310 for securing the preliminary mounting member 303 and a groove portion for a leg portion 311 for securing the leg portion 304 are provided on the top face of the mounting member 302. Also, a fixed portion 313 is installed under the bottom face of the mounting member 302 in the downward direction and is configured so as to maintain the mounting member 302 at a prescribed height.

Also, out of the top face of the mounting member 302, a portion aside from portions having the groove portion for a preliminary mounting member 310 and the groove portion for a leg portion 311 are able to contact the end face of the honeycomb structure when the honeycomb structure is placed. A flat plane surrounded by the periphery of the top face of the mounting member 302 (including the flat plane configured by the portion) is termed the structure mounting surface 302a.

The structure mounting surface 302a is a plane having a shape configured to contact the entire periphery of the end face of the honeycomb structure 130. By setting the shape of the structure mounting surface 302a in this manner, it is possible to place the honeycomb structure 130 on the structure mounting surface 302a in a stable manner.

The groove portion for a preliminary mounting member 310 has approximately the same plan view shape as the plan view shape of the preliminary mounting member 303, and a small space is provided in between the side wall face of the groove portion for a preliminary mounting member 310 and the side face of the preliminary mounting member 303 to allow the preliminary mounting member 303 to move up and down in a smooth manner.

Also, a depth of the groove portion for a preliminary mounting member 310 is the same size as a thickness of the preliminary mounting member 303 so that the preliminary mounting surface 303a and the structure mounting surface 302a may occupy the same plane when the preliminary mounting member 303 is lowered to its lowest position.

The groove portion for a leg portion 311 has approximately the same plan view shape as the plan view shape of die leg portion 304, and there is a small space provided in between the side wall face of the groove portion for a leg portion 311 and the side face of the leg portion 304 to allow the leg portion 304 to move up and down in a smooth manner.

Also, a depth of the groove portion for a leg portion 311 is the same as the total thickness of the preliminary mounting member 303 and the leg portion 304 so that the preliminary mounting surface 303a and the structure mounting surface 302a may come to occupy the same plane when the leg portion 304 is lowered to its lowest position.

Also, a through hole 312 is provided on the bottom face of the groove portion for a leg portion 311, and a shaft 305 (see FIGS. 3(a), 3(b), and 5) penetrates this through hole 312 so as to move up and down.

The fixed portion 313 is configured by a pillar portion 313a having a round pillar shape, and a round pillar-shaped base portion 313b, having a round pillar shape, thicker than the pillar portion 313a, and can be situated at a position with the mounting member 302 being maintained at a prescribed height.

As illustrated in FIG. 5, the preliminary mounting member 303 is donut-shaped, and on the top face thereof, honeycomb structure is initially placed before the placement of the honeycomb structure 130 on the mounting member 302.

And the plane including the top face of the preliminary mounting member 303 is termed 'preliminary mounting surface 303a'.

When superimposing the preliminary mounting surface 303a onto the end face of the honeycomb structure 130, the shape of the preliminary mounting surface 303a is a shape allowing the entire periphery of the preliminary mounting surface 303a to exist inside the periphery of the end face of the honeycomb structure 130.

Because of this, it is possible to support the honeycomb structure 130 in such a manner that the entirety of the preliminary mounting surface 303a is situated inside the periphery of the end face of the honeycomb structure 130 without making contact with the periphery of the end face 130a of the honeycomb structure 130.

Also, the preliminary mounting surface 303a is configured to occupy a plane parallel to the structure mounting surface 302a.

Because of this, when lowering the preliminary mounting surface 303a to place the honeycomb structure on the structure mounting surface 302a with the preliminary mounting surface 303a supporting the honeycomb structure, it is possible to prevent generation of chipping, cracking, and the like on the periphery of the end face 30a of the honeycomb structure 130 without applying strong shock to the periphery of the end face 130a (see FIGS. 3(a) and 3(b)) of the honeycomb structure 130.

In the honeycomb structure mounting base 301, as illustrated in FIG. 5, one end of a rectangular pillar-shaped leg portion 304 is fixed at its top face to a lower portion of a preliminary mounting member 303, and one end of a shaft 305 forming an elevating mechanism is fixed to a portion on the other end of the leg portion 304. Further, a metal plate 306 is fixed to the other end of the shaft 305, and an air cylinder 309 is installed to the bottom face of the metal plate 306 through a cylinder plate 307 and a rod 308. In this manner, in the honeycomb structure mounting base, the preliminary mounting member 303 and the elevating mechanism are joined through the leg portion. And the rod 308 is moved up and down by setting the air cylinder 309 into motion, and this up and down movement of the rod 308 travels through the cylinder plate 307 to move the metal plate 306 up and down. As a result of this, it is possible to move the preliminary mounting member 303 up and down.

Herein below, the constituent members of the leg portion and the elevating mechanism will be described in a bit more detail.

The leg portion 304 is fixed to the bottom portion of the preliminary mounting member 303, and is used to convey up and down movement of the shaft 305 to the preliminary mounting member 303.

The top face of the leg portion 304 is always at a position lower than the top face of the preliminary mounting member 303, and is configured so as not to contact the end face of the honeycomb structure 130 when supporting the honeycomb structure 130 on the preliminary mounting surface 303a.

Also, five units of the leg portions 304 are installed in a radial direction at equal intervals centered around a center of gravity of the preliminary mounting surface 303a, and is configured in such a manner that the angle formed by two line segments connecting the center of gravity of two adjacent units of the leg portions 304 with respect to the center of gravity of the preliminary mounting surface 303a is 72°.

The shaft 305 is a member for conveying up and down movement of the metal plate 306 to the leg portion 304, as one end of the shaft 305 is fixed to the leg portion 304 while the other end is fixed to the metal plate 306.

Also, the shaft 305 penetrates the through hole 312 and conveys up and down movement between the front and back sides of the mounting member 302.

A plurality of shafts 305 are fixed to the top face of the metal plate 306, and on the bottom face thereof are fixed a plurality of cylinder plates 307. The cylinder plate 307 is installed to the air cylinder 309 through a rod 308, and as the rod 308 is set into up and down movement by the drive of the air cylinder 309 the metal plate 306 also is set into up and down movement.

Also, the metal plate 306 is shaped like a rectangular-ring shape that has had a central portion hollowed out in a square form. The pillar portion 313a of the mounting member 302 penetrates the metal plate through the hollowed out portion 306a. The hollowed out portion 306a has a size at which the wall face of the hollowed out portion does not contact the side face of the pillar portion 313a. And because of this, the metal plate 306 moves up and down with no interference with the pillar portion 313a of the mounting member 302.

The air cylinder 309 is a member for moving the rod 308 up and down, then moving up and down the cylinder plate 307 fixed to the rod 308, and moving the metal plate 306 up and down. The range of the up and down movement of the rod 308 is set to include at least a position at which the preliminary mounting surface 303a is higher than the structure mounting surface 302a, and a position at which the preliminary mounting surface 303a and the structure mounting surface 302a occupy the same flat plane.

Figure 6:
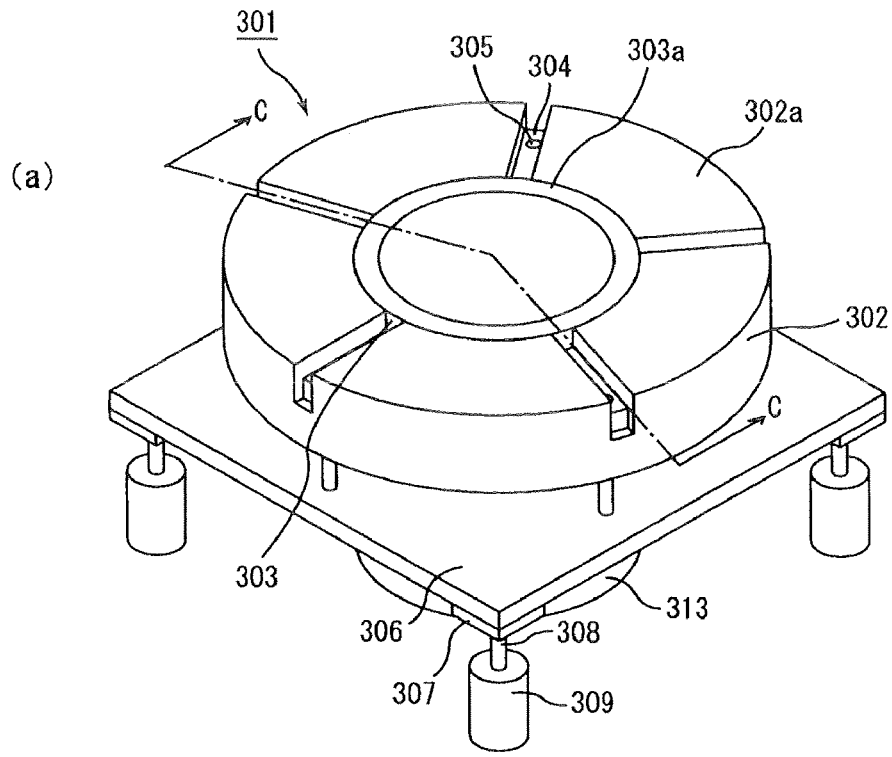
FIG. 6(a) is a perspective view schematically illustrating a state in which a preliminary mounting surface is moved downward in the honeycomb structure mounting base illustrated in FIGS. 3(a), 3(b) and 6(b) is a cross-sectional view taken along line C-C of the honeycomb structure mounting base illustrated in FIG. 6(a).
Figure 6:
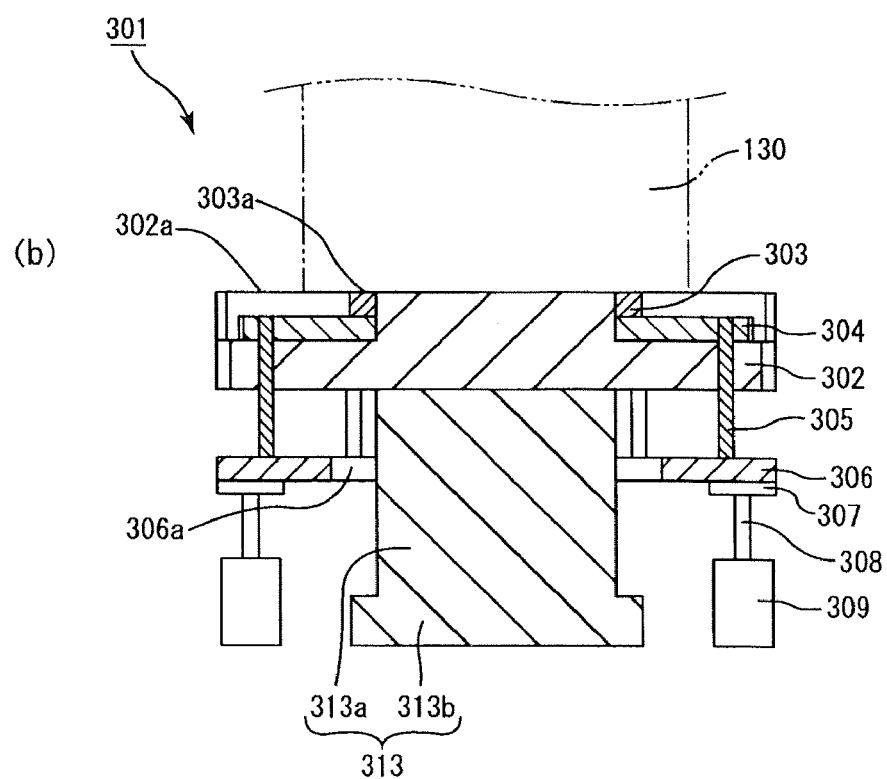

Next, description will be given in regard to a method for placing the honeycomb structure 130 on the honeycomb structure mounting base 301. Here, the description of the method of placing the honeycomb structure 130 on the honeycomb structure mounting base 301 will be given referencing FIGS. 6(a) and 6(b) along with FIGS. 3(a) and 3(b).

FIG. 6(a) is a perspective view schematically illustrating a state in which a preliminary mounting surface is moved downward in the honeycomb structure mounting base illustrated in FIGS. 3(a) and 3(b), and FIG. 6(b) is a cross-sectional view taken along line C-C of the honeycomb structure mounting base illustrated in FIG. 6(a).

The appearance of the preliminary mounting surface in a raised state is illustrated in FIGS. 3(a) and 3(b) while the appearance of the preliminary mounting surface in a lowered state is illustrated in FIGS. 6(a) and 6(b).

When placing the honeycomb structure 130 on the honeycomb structure mounting base 301, first, the air cylinder 309 is driven to realize a state of the preliminary mounting surface 303a being positioned higher than the structure mounting surface 302a.

Next, the honeycomb structure 130 is supported on the preliminary mounting surface 303a in this state (see FIGS. 3(a) and 3(b)). When doing this, the honeycomb structure 130 is supported on the preliminary mounting surface 303a in such a manner that the entirety of the preliminary mounting surface 303a lies inside the periphery of the end face of the honeycomb structure 130. By supporting the honeycomb structure 130 in this manner, the periphery of the end face 130a of the honeycomb structure does not contact the preliminary mounting surface 303a thereby making it possible to prevent generation of chipping, cracking, or the like on the periphery of the end face of the honeycomb structure.

Next, move the preliminary mounting member supporting the honeycomb structure 130 from the state illustrated in FIGS. 3(a) and 3(b) to the state illustrated in FIGS. 6(a) and 6(b).

More specifically, lower the preliminary mounting member 303 by the elevating mechanism so that the preliminary mounting surface 303a positioned higher than the structure mounting surface 302a may come to be positioned on the same flat plane as the structure mounting surface 302a.

Here, by lowering the preliminary mounting surface 303a in a state of supporting the honeycomb structure 130 to the position mentioned above, the honeycomb structure 130 will be placed on the structure mounting surface 302a of the mounting member 302.

When this happens, since the preliminary mounting surface 303a and the structure mounting surface 302a are the parallel planes, the honeycomb structure is lowered while maintaining a state of parallelism of the end face of the honeycomb structure with respect to the structure mounting surface 302a. And when the preliminary mounting surface 303a is lowered to the same plane as the structure mounting surface 302a, since the structure mounting surface 302a exhibits a shape which contacts the entirety of the periphery of the end face of the honeycomb structure 130, the entire end face including the periphery of the end face 130a of the honeycomb structure 130 (excluding a portion that contacts the preliminary mounting surface 303a) contacts the structure mounting surface 302a simultaneously.

Because of this, the honeycomb structure 130 is placed on the structure mounting surface 302a in a stable manner (see FIGS. 6(a) and 6(b)).

Therefore, the honeycomb structure 130 is placed on the structure mounting surface 302a in a manner that does not place the periphery of the end face 130a of the honeycomb structure 130 under strong shock or generate chipping, cracking, or the like on the periphery of the end face of the honeycomb structure.

After having placed the honeycomb structure on the structure mounting surface 302a in this manner, an inspection or the like is conducted to the honeycomb structure.

Afterward, the honeycomb structure 130 is removed from the honeycomb structure mounting base 301 by raising, lifting, or the like and moved to another location.

And after having moved the honeycomb structure to another location, the preliminary mounting member 303 is once more raised by the elevating mechanism without supporting the honeycomb structure 130. By doing this, it is possible to then support another honeycomb structure on the preliminary mounting surface 303a.

Therefore, in the honeycomb structure mounting base according to the embodiment of the present invention, desirably, the honeycomb structure is supported on the preliminary mounting surface positioned higher than the structure mounting surface, the honeycomb structure is placed on the structure mounting surface by the elevating mechanism lowering the preliminary mounting surface to at least a position of the structure mounting surface, and the preliminary mounting surface is once again raised to a position at least higher than the structure mounting surface by using the elevating mechanism, with the preliminary mounting surface not supporting the honeycomb structure.

Also, in the honeycomb structure mounting base 301 illustrated in FIGS. 3 to 6, although the honeycomb structure mounting base is configured in such a manner that the preliminary mounting surface 303a and the structure mounting surface 302a occupy the same plane when the preliminary mounting member 303 is lowered to its lowest position, it is also acceptable to configure the honeycomb structure mounting base according to the embodiment of the present invention in such a manner that the preliminary mounting surface 303a is lowered to a position lower than the structure mounting surface 302a when the preliminary mounting member 303 is lowered to its lowest position.

In such a case, although the end face of the honeycomb structure 130 and the preliminary mounting surface 303a do not contact one another when the honeycomb structure 130 is placed on the mounting member 302, since the end face of the honeycomb structure 130 contacts the structure mounting surface 302a that contacts the entirety of the periphery of the end face of the honeycomb structure, the honeycomb structure 130 can be placed on the structure mounting surface 302a in a stable manner.

Even on a honeycomb structure mounting base configured in this manner, the honeycomb structure 130 can be placed without generation of chipping, cracking, or the like on the periphery of the end face 130a of the honeycomb structure 130.

Up to this point a honeycomb structure mounting base including an elevating mechanism configured to move up and down a preliminary mounting member has been described as the honeycomb structure mounting base according to the embodiment of the present invention. However, it is possible for the honeycomb structure mounting base according to the embodiment of the present invention to include the elevating mechanism configured to move up and down a mounting member in place of the elevating mechanism configured to move up and down the preliminary mounting member.

Description will be given in regard to the honeycomb structure mounting base according to this kind of embodiment with reference to FIGS. 7(a), 7(b), 8(a), and 8(b).

Figure 7:
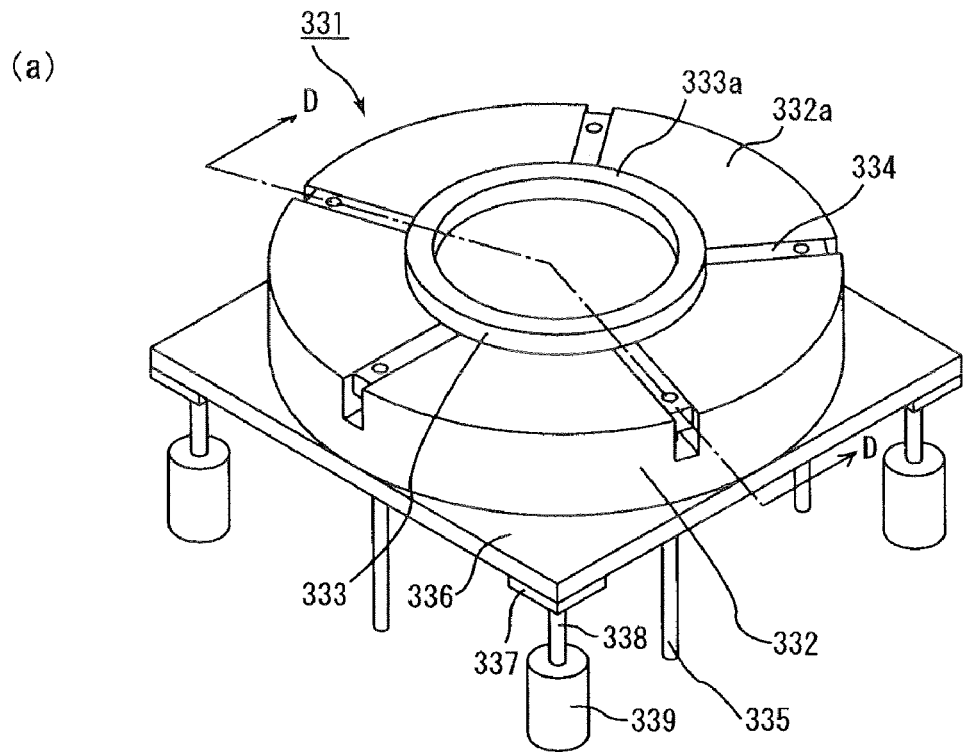
FIG. 7(a) is a perspective view schematically illustrating another example of the honeycomb structure mounting base according to the embodiment of the present invention.
FIG. 7(b) is a cross-sectional view taken along line D-D of the honeycomb structure mounting base illustrated in FIG. 7(a).
Figure 7:
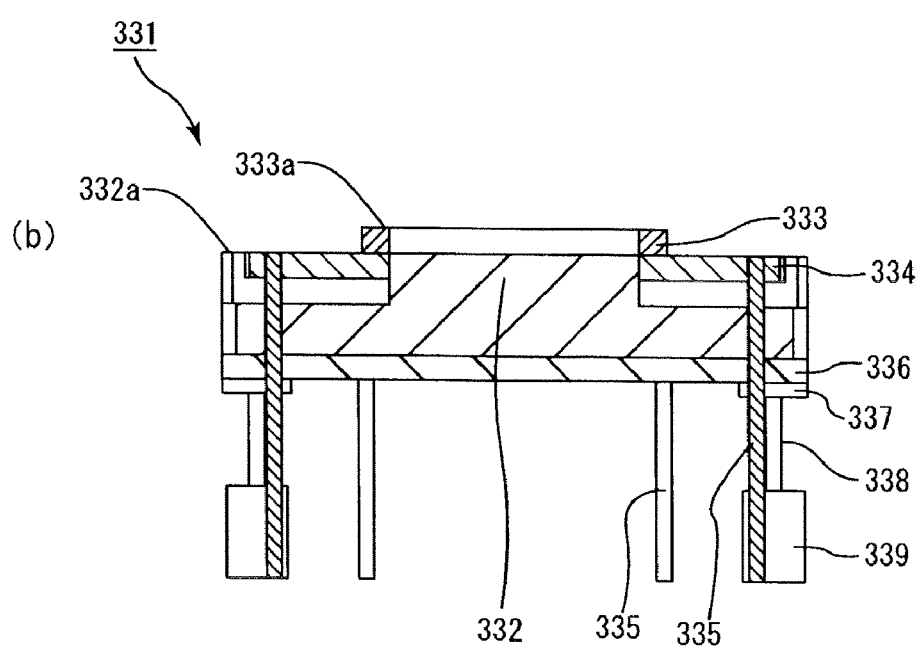
Figure 8:
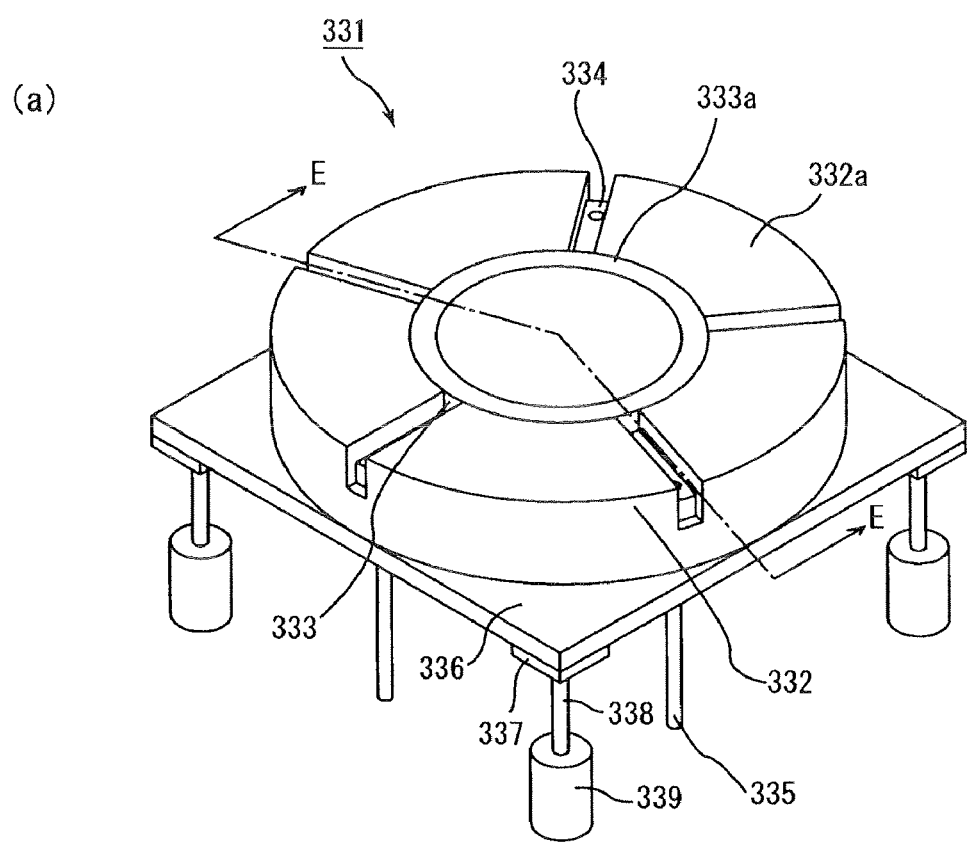
FIG. 8(a) is a perspective view schematically illustrating a state in which a preliminary mounting surface and a structure mounting surface are made in the same plane.
FIG. 8(b) is a cross-sectional view taken along line E-E of the honeycomb structure mounting base illustrated in FIG. 8(a).
Figure 8:
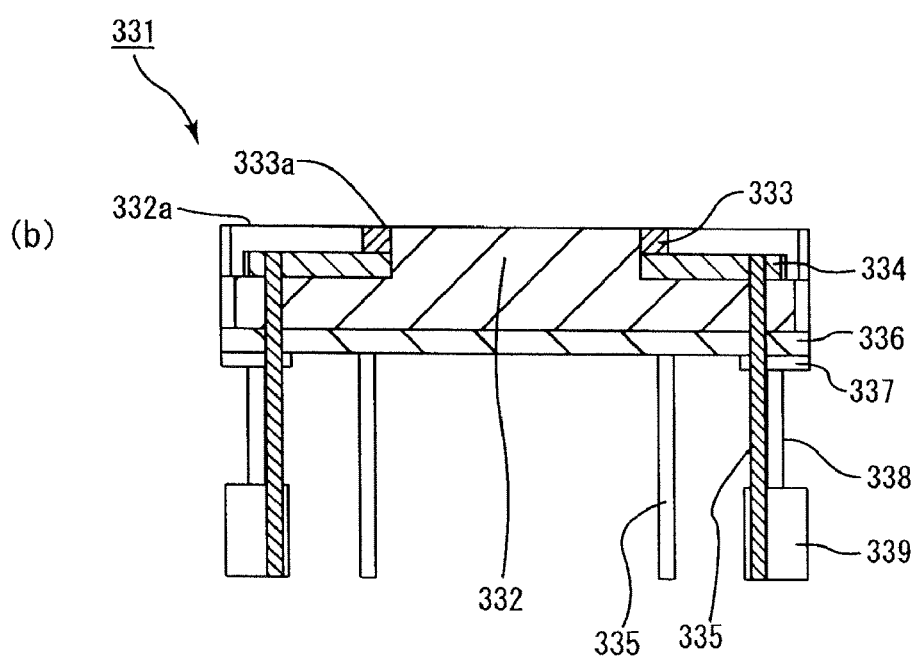

FIG. 7(a) and FIG. 8(a) are perspective views each schematically illustrating another example of the honeycomb structure mounting base according to the embodiment of the present invention, FIG. 7 (b) is a cross-sectional view taken along line D-D of the honeycomb structure mounting base illustrated in FIG. 7(a), and FIG. 8(b) is a cross-sectional view taken along line E-E of the honeycomb structure mounting base illustrated in FIG. 8(a).

Moreover, FIGS. 7(a) and 7(b) illustrates a state in which a preliminary mounting surface is positioned higher than a structure mounting surface, and FIGS. 8(a) and 8(b) illustrates a state in which a preliminary mounting surface and a structure mounting surface are made in the same plane.

Also, as illustrated in FIGS. 7(a), 7(b), 8(a), and 8(b), a honeycomb structure mounting base 331 in which a mounting member 332 moves up and down includes a mounting member 332, a preliminary mounting member 333, and an elevating mechanism having a metal plate 336, a cylinder plate 337, a rod 338, and an air cylinder 339.

Here, the mounting member 332 is configured in the same manner as in the mounting member 302 used in the honeycomb structure mounting base 301 illustrated in FIGS. 3(a) and 3(b). And the preliminary mounting member 333 is configured in the same manner as in the preliminary mounting member 303 used in the honeycomb structure mounting base 301 illustrated in FIGS. 3(a) and 3(b). For this reason, detailed description of the mounting member 332 and the preliminary mounting member 333 has been omitted.

The honeycomb structure mounting base 331 is configured in such a manner that not the preliminary mounting member 333 but the mounting member 332 moves up and down.

More specifically, one end of a rectangular pillar-shaped leg portion 334 is fixed to the bottom portion of the preliminary mounting member 333, while an end of a fixation leg 335 is fixed to the portion of the other end of the leg portion 334. Therefore, the preliminary mounting member 333 is situated while maintained at a prescribed height by the fixation leg 335 and the leg portion 334.

Alternately, the mounting member 332 is integrated with the metal plate 336 fitted on its bottom face, and the mounting member 332 is configured so as to move up and down when the metal plate 336 moves up and down.

And fitted to the bottom face of the metal plate 336 through the cylinder plate 337 and the rod 338 is the air cylinder 339.

The cylinder plate 337, the rod 338, and the air cylinder 339 have the same configurations as those of the honeycomb structure mounting base 301 illustrated in FIGS. 3(a) and 3(b). Also, although the central portion of the metal plate 336 is not hollowed out as compared to the metal plate used in the honeycomb structure mounting base 301, there are through holes formed at prescribed sites for penetrating the fixation leg 335 therethrough.

Therefore, the honeycomb structure mounting base 331 includes the elevating mechanism configured to move the mounting member 332 up and down, and the metal plate 336, the cylinder plate 337, the rod 338, and the air cylinder 339 work together to function as the elevating mechanism.

Next, a brief description will be given in regard to a method for placing the honeycomb structure on the honeycomb structure mounting base 331 with reference to FIGS. 7(a), 7(b), 8(a), and 8(b).

When placing the honeycomb structure on the honeycomb structure mounting base 331, first, the air cylinder 339 is driven to bring on the state (see FIGS. 7(a) and 7(b)) of the structure mounting surface 332a being positioned lower than the preliminary mounting surface 333a.

Next, the honeycomb structure is supported on the preliminary mounting surface 333a this state. When doing this, the honeycomb structure is supported in such a manner that the entire preliminary mounting surface 333a is positioned inside the periphery of the end face of the honeycomb structure.

Next, the mounting member 332 is moved from the state illustrated in FIGS. 7(a) and 7(b) to the state illustrated in FIGS. 8(a) and 8(b).

More specifically, the mounting member 332 is raised by the elevating mechanism so that the structure mounting surface 332a positioned lower than the preliminary mounting surface 333a may occupy the same plane as the preliminary mounting surface 333a.

Here, by raising the mounting member 332 to a position at which the structure mounting surface 332a occupies the same plane as the preliminary mounting surface 333a while supporting the honeycomb structure on the preliminary mounting surface 333a, the honeycomb structure will be placed on the structure mounting surface 332a.

When this happens, since the preliminary mounting surface 333a and the structure mounting surface 332a are the parallel planes, and the structure mounting surface 332a has a shape configured to contact the entire periphery of the end face of the honeycomb structure, the honeycomb structure is stably placed on the mounting member 332 so as not to generate chipping, cracking, or the like on the periphery of the end face of the honeycomb structure.

Then, after placement of the honeycomb structure, in the same manner as used on the honeycomb structure mounting base 301 illustrated in FIGS. 3(a) and 3(b), inspection or the like of the honeycomb structure is conducted, subsequently the honeycomb structure is moved to another location, and then the mounting member 332 is lowered to thereby support another honeycomb structure on the preliminary mounting surface 333a.

This honeycomb structure mounting base 331 is also one embodiment of the honeycomb structure mounting base of the present invention.

In addition, the honeycomb structure mounting base according to the embodiment of the present invention, desirably, the end face shape of the honeycomb structure and the peripheral shape of the preliminary mounting surface are similar to one another.

This is because when the shapes are indeed similar, when supporting the honeycomb structure on the preliminary mounting surface, it is easy to support the honeycomb structure in such a manner that the periphery of the end face of the honeycomb structure makes no contact with the preliminary mounting surface.

And also because when the shapes are similar, it will be easier to support the honeycomb structure on the preliminary mounting surface in an even more stable manner.

The shape of the preliminary mounting member having the preliminary mounting surface of this kind is not particularly limited; however, in a case where the end face of the honeycomb structure is circular, a unit with a donut shape as illustrated in FIG. 5 may be preferably used.

As has been set forth herein above, desirably, the shape of the periphery of the preliminary mounting surface and the shape of the end face of the honeycomb structure are similar because it becomes easy to support the honeycomb structure in a stable manner.

Also, by setting the shape of the mounting member to a donut shape, it is possible for the structure mounting surface to also exist in the portion inside the preliminary mounting member. Because of this, when the preliminary mounting surface has reached a position at which it occupies the same plane as the structure mounting surface or a position lower than the structure mounting surface, the end face of the honeycomb structure also contacts the structure mounting surface existing inside the donut shape, which thereby makes it easy to place the honeycomb structure in an even more stable manner.

Also, it is acceptable to apply a chamfer to the outer or inner rim portions of the preliminary mounting member. This is because by the portions being chamfered in such a manner, when the end face of the honeycomb structure contacts the preliminary mounting member, the concern of damage or deformation being generated on the honeycomb structure or preliminary mounting member will be small. Examples of the chamfering include a C chamfer, an R chamfer, and the like.

In addition, as illustrated in FIG. 5, the honeycomb structure mounting base according to the embodiment of the present invention, desirably, further including a leg portion attached to a lower portion of the preliminary mounting surface in a radial direction and at equal intervals centered around a center of gravity of the preliminary mounting surface, wherein the preliminary mounting member is desirably configured to be moved up and down with the leg portion running in conjunction with the elevating mechanism.

If leg portions such as these are used in the honeycomb structure mounting base, when the honeycomb structure is supported on the preliminary mounting surface, the weight of the honeycomb structure is distributed equally on each of the leg portions. Because of this, an excessive load does not come to bear down upon any specific leg portion when the honeycomb structure is supported, making it easy to improve the durability of the leg portion and achieve a honeycomb structure mounting base of an even longer effective life span.

Also, the configuration of this kind of leg portion is the configuration most suited for maintaining the state in which the preliminary mounting surface and the structure mounting surface stay parallel when supporting the honeycomb structure on the preliminary mounting surface.

Also, in the honeycomb structure mounting base according to the embodiment of the present invention, the number of the leg portions is not particularly limited, and the number of the leg portions is desirably three or more. Also, the honeycomb structure mounting base according to the embodiment of the present invention does not necessarily include the leg portion. For example, it is perfectly acceptable for the honeycomb structure mounting base configured in the manner illustrated in FIGS. 3(a) and 3(b) to have a configuration in which the preliminary mounting member 303 is fixed to the shaft 305 directly, as it is also acceptable for the honeycomb structure mounting base configured in the manner illustrated in FIGS. 7(a) and 7(b) to have a configuration in which the preliminary mounting member 333 is fixed to the fixation leg 335 directly.

The constituent material of the mounting member is not particularly limited as long as it has sufficient strength to achieve a flat top face and to allow stable placement of a honeycomb structure. Examples of the constituent material thereof include metals such as stainless (SUS), steel, and nickel alloys, and ceramics such as silicon carbide, tungsten carbide, and the like.

Also, it is also acceptable to form a coat layer of ceramics, metal, or the like, on the top face of a mounting member configured of any of the materials. The formation of the coat layer may be implemented by coating and hardening, plating, spray coating, or the like.

Also, it is acceptable to apply flattening treatments such as polishing on the top face of the mounting member.

Also, being a portion that makes contact with the end face of the honeycomb structure, the top face of the mounting member is desirably a smooth and flat surface. This is because if there are protrusions or the like present on the top face there is a concern that chipping, cracking, or the like will be generated on the end face of the honeycomb structure when the honeycomb structure contacts the structure mounting surface.

The shape of the fixed portion is not particularly limited as long as it is a shape that allows the placement of the mounting member on a placement location with the mounting member maintained at a prescribed height.

The constituent material of the preliminary mounting member is not particularly limited as long as it has sufficient strength to achieve a flat top face and to allow stable placement of a honeycomb structure. Examples of the constituent material thereof include metal, ceramic, resin, and the like. Out of the materials, resin is the most desirable.

It is presumably because compared with metal or the like, the hardness of resin is lower, which lowers the concern that chipping, cracking, or the like might be generated on the end face of the honeycomb structure.

Also, fluororesin is desirable for use as the resin for use as the constituent material of the preliminary mounting member. This is because as compared with other resins, fluororesin has higher malleability and is more easily handled.

It is also acceptable to form a coat layer from a resin or the like on the surface of the ceramic or metallic base material of the preliminary mounting member.

The constituent material of the leg portion is not particularly limited as long as it has sufficient strength to support the honeycomb structure in a stable manner. Examples of the constituent material thereof include resin, metal, ceramic, and the like.

Also, the shape of the leg portion is also not particularly limited, and rectangular pillar shapes, round pillar shapes, rectangular plate shapes, and the like are acceptable.

The constituent material of the shaft and the fixation leg is not particularly limited as long as it has sufficient strength to support the honeycomb structure in a stable manner. Examples of the constituent material thereof include metal, ceramics, resin, and the like.

Also, the shape of the shaft and the fixation is also not particularly limited, and rectangular pillar shapes, round pillar shapes, and the like are acceptable.

Also, the installation locations of the cylinder plate (fixed to the bottom face of the metal plate) and the cylinder (fitted to the cylinder plate through the rod) are not particularly limited. However, the installation locations are desirably locations that are point-symmetrical with respect to the center of the metal plate. This is for the sake of allowing the metal plate to be moved up and down in a smooth manner.

Also, the number of installed units of the cylinder plate or the cylinder is not particularly limited. However, the number of installed units is desirably three or more from the standpoint of enabling the metal plate to move up and down in a smooth manner.

Also, examples in which an air cylinder is used as a constituent member of the elevating mechanism are illustrated in examples of the honeycomb structure mounting base according to the embodiment illustrated in FIGS. 3 to 8. The cylinder used as the constituent member of the elevating mechanism is not limited to an air cylinder, and it is also possible to use an oil cylinder, an electric-powered cylinder, or the like in place.

Also, the honeycomb structure mounting base according to the embodiment of the present invention may include a rotating table on the bottom most portion thereon. More specifically, it is acceptable that the honeycomb structure mounting base according to the embodiment of the present invention be configured in such a manner that the entirety of the honeycomb structure mounting base 301 illustrated in FIGS. 3 to 6, or the entirety of the honeycomb structure mounting base 331 illustrated in FIGS. 7(a), 7(b), 8(a), and 8(b) is placed on a rotating table so as to rotate with the honeycomb structure placed on the structure mounting surface.

This is because a honeycomb structure mounting base that is able to rotate a honeycomb structure with the honeycomb structure placed thereon is desired in the embodiments of honeycomb structure inspection apparatuses and the like to be described herein below.

Next description will be given in regard to the honeycomb structure inspection apparatus according to the embodiment of the present invention.

The honeycomb structure inspection apparatus according to the embodiment of the present invention includes a honeycomb structure mounting base configured to have placed an inspection subject of the honeycomb structure thereon and an inspection device configured to inspect an external shape and/or internal shape of the honeycomb structure.

Since it is possible to preferably use the honeycomb structure mounting base according to the embodiment of the present invention described herein above as the honeycomb structure mounting base, detailed description has been omitted. At this point, description instead will be given in regard to the honeycomb structure inspection apparatus according to the embodiment of the present invention focusing centrally on the inspection device configured to inspect the external or internal shape of the honeycomb structure.

Moreover, in the present description, the term 'inspection of the honeycomb structure' is used to refer to the act of inspecting the external or internal shape of the honeycomb structure, and the term 'honeycomb structure inspection apparatus' is used to refer to an apparatus configured for inspecting the external or internal shape of the honeycomb structure.

It is possible to use a shape inspection apparatus employing a laser light or a contact probe, a defect inspection apparatus employing thermal imaging or penetrant inspection techniques, or the like, as the inspection device. And by using such inspection devices, it is possible to conduct inspection of the external or internal shape of the honeycomb structure.

And, it is desirable that the honeycomb structure shape intended for inspection with the honeycomb structure inspection apparatus according to the embodiment of the present invention is an external shape. In the honeycomb structure inspection apparatus according to the embodiment of the present invention, the external shape is not particularly limited, and desirably includes at least one property selected from the group consisting of: length in a longitudinal direction, a maximum diameter, a degree of roundness, a degree of squareness, a degree of parallelism, and a degree of position, of the honeycomb structure. Usually, the honeycomb structure is put into use inside a casing; and the matter of whether or not the external shape at this time is a prescribed shape is very important. Also, the external shape is a property that easily varies in manufacturing the honeycomb structure.

Herein below, description will be given in a bit more detail in regard to the honeycomb structure inspection apparatus of the embodiment including the inspection device.

First, description will be given in regard to a honeycomb structure inspection apparatus according to the embodiment including a shape inspection apparatus employing the laser light.

Figure 9:
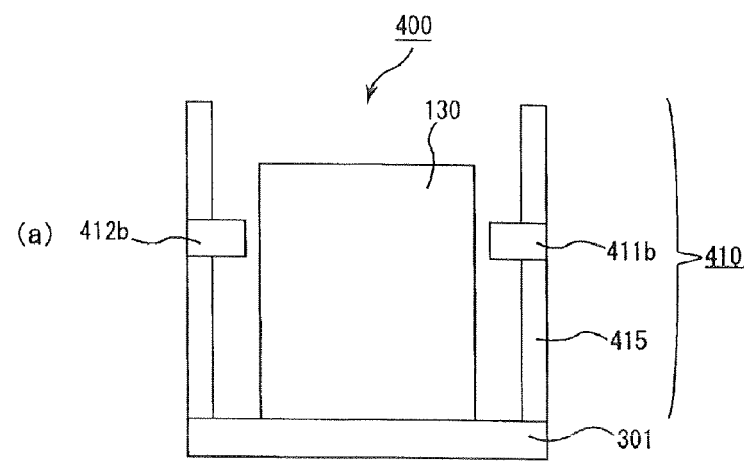
FIG. 9(a) is a front view schematically illustrating an example of a honeycomb structure inspection apparatus according to the embodiment of the present invention including a shape inspection apparatus employing a laser light.
FIG. 9(b) is a top plan view schematically illustrating a way in which a round pillar-shaped honeycomb fired body is inspected using the honeycomb structure inspection apparatus illustrated in FIG. 9(a)
FIG. 9(c) is a top plan view schematically illustrating a way in which a cylindroid honeycomb fired body is inspected in the same manner as in FIG. 9(b) using the honeycomb structure inspection apparatus illustrated in FIG. 9(a).
Figure 9:
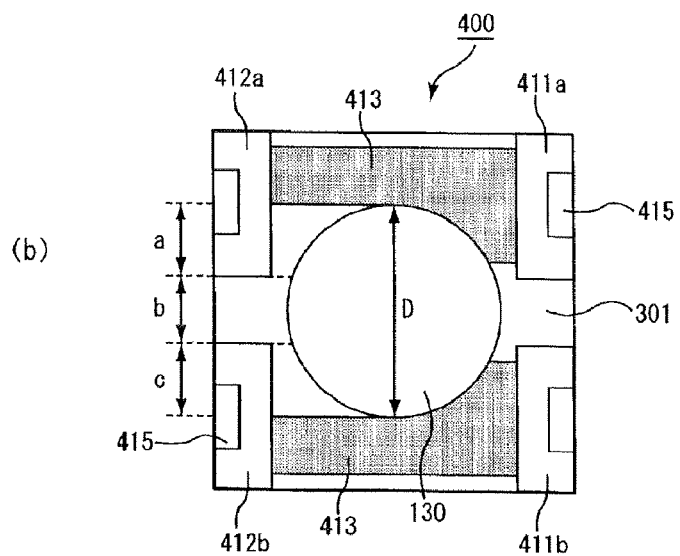
Figure 9:
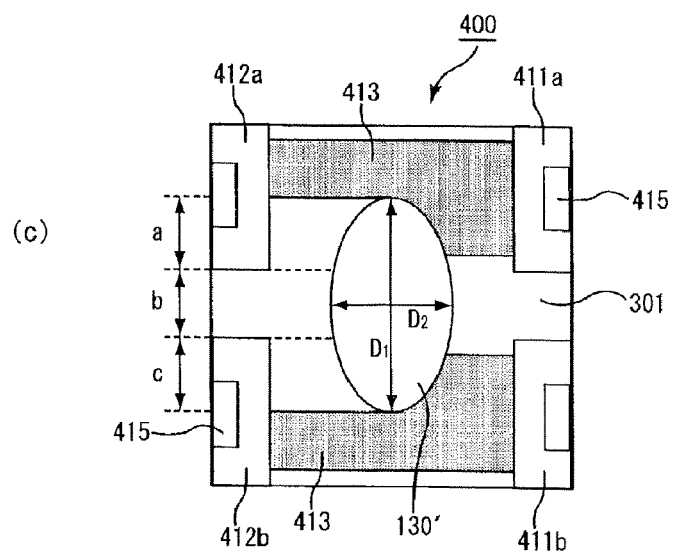

FIG. 9(a) is a front view schematically illustrating an example of a honeycomb structure inspection apparatus according to the embodiment of the present invention including a shape inspection apparatus employing a laser light, and FIG. 9(b) is a top plan view of the honeycomb structure inspection apparatus illustrated in FIG. 9(a). Moreover, the inspection subject in FIGS. 9(a) and 9(b) is a round pillar-shaped honeycomb structure.

Also, FIG. 9(c), in the same manner as in FIG. 9(b), is a top plan view schematically illustrating the honeycomb structure inspection apparatus illustrated in FIG. 9(a). However, in Fig. (c) the inspection subject is a cylindroid honeycomb structure.

As illustrated in FIGS. 9(a) and 9(b), a honeycomb structure inspection apparatus 400 includes a honeycomb structure mounting base 301, and a shape inspection apparatus 410 including two laser irradiation apparatuses 411a and 411b providing a light source, two laser receiving apparatuses 412a and 412b providing light receiving portions, and a support portion 415 (support member) configured to fit these members in place.

In the honeycomb structure inspection apparatus 400, four units of the support portions 415 are disposed perpendicularly with respect to the top face of the honeycomb structure mounting base 301, and to each unit of the support portions 415 there is disposed one of either the irradiation apparatus 411a, the irradiation apparatus 411b, the laser receiving apparatus 412a, or the laser receiving apparatus 412b. Here, the laser irradiation apparatus and the laser receiving apparatus are disposed in such a manner that a single irradiation apparatus 411a is disposed facing a single laser receiving apparatus 412a, and a single irradiation apparatus 411b is disposed facing a single laser receiving apparatus 412b, to form a row of pairs of one laser irradiation apparatus and one light receiving apparatus.

And the honeycomb structure mounting base 301 is so constructed that the honeycomb structure is disposed between the irradiation apparatus 411a, 411b and the laser receiving apparatus 412a, 412b when placing the honeycomb structure, which is the inspection subject here, on the honeycomb structure mounting base 301.

In the honeycomb structure inspection apparatus 400, a laser light 413 is applied at a constant angle (for example 90°) with respect to the front face of the irradiation apparatus 411a, and irradiation apparatus 411b while being applied at the same angle while moving the light source in a parallel direction within a constant range. Therefore, the laser light applied from the irradiation apparatus 411a, irradiation apparatus 411b, if there is no obstacle present, reaches a light receiving element of the laser receiving apparatus 412a, and the laser receiving apparatus 412b, the light receiving element thereby sensing the laser light. Alternately, when the laser light 413 is applied, at places where the honeycomb structure 130 exists in front of the laser light applied here, the laser light 413 is interrupted, and thus the laser light is not sensed by the light receiving element.

Also, the laser receiving apparatus 412a, the laser receiving apparatus 412b are provided at constant (b mm) intervals.

Here, in a case in which a round pillar-shaped honeycomb structure is used as the inspection subject, first, the honeycomb structure 130 is placed on the honeycomb structure mounting base 301. Next, as illustrated in FIG. 9(b), a width value 'a mm' is detected at which a laser light did not reach the light receiving element when applying the laser light 413 from the irradiation apparatus 411a while moving the light source in a parallel direction, and a width value 'c mm' is detected at which a laser light did not reach the light receiving element when applying a laser light from the irradiation apparatus 411b while moving the light source in a parallel direction. At that, the diameter 'D' of the round pillar-shaped honeycomb structure here is expressed by a+b+c (mm).

Then, the measurement is conducted a plurality of times while rotating the round pillar-shaped honeycomb structure 130 intermittently until one full rotation (360°) has been reached, and then change the height at portions to be measured, and further the measurement is conducted. Afterward, the diameter of the honeycomb structure is derived by calculating the average value of the diameters obtained at the respective measuring points.

In this manner, it is possible to conduct measurement of the 'diameter' (that is one of the external shapes of the honeycomb structure), by using the honeycomb structure inspection apparatus 400.

Also, the honeycomb structure mounting base 301, not illustrated in the figures, further includes the rotating table mentioned above configured to rotate the mounting member and the preliminary mounting member.

Alternately, as illustrated in FIG. 9(c), in a case where a cylindroid honeycomb structure 130' having both a major axis and a minor axis is the inspection subject, measurement of the width thereof is conducted according to the principle based on a width of a portion at which the laser light 413 is interrupted, and the longest value is set as the major axis while the shortest value as the minor axis. Since the honeycomb structure 130' rotates 360°, a portion with the same width is measured twice. It is possible to conduct measurement of the major and minor axes of the honeycomb structure by conducting the measurement while varying the height of the laser light 413 and calculating the average value of the major and minor axes obtained at the respective measuring points.

It is also possible to calculate the values of properties such as a maximum diameter or a degree of roundness of the honeycomb structure from the measurement results of the diameter, major axis, and minor axis measured in the manner.

It is also possible to calculate a degree of squareness of the honeycomb structure from the measurement results of the diameter, major axis, and minor axis obtained in the measurement in which the height of the laser light 413 applying the laser light was varied intermittently.

The laser light is not particularly limited in the shape inspection apparatus 400, and examples thereof include a $CO_2$ laser, a YAG laser, an excimer laser, and the like.

The light receiving element provided in the laser receiving apparatus 412a and the laser receiving apparatus 412b is not particularly limited, and it is possible to use presently known light receiving elements as the light receiving element herein.

Also, although the honeycomb structure inspection apparatus 400 illustrated in FIGS. 9(a), 9(b), and 9(c) is configured so as to rotate the honeycomb structure when conducting the inspection of the honeycomb structure, the honeycomb structure inspection apparatus according to the embodiment including the two groups of the laser irradiation apparatus and the laser receiving apparatus may also be configured so as to allow measurement of the diameter or the like of the honeycomb structure by rotating around the honeycomb structure with the laser irradiation apparatus and the laser receiving apparatus being disposed facing each other across the honeycomb structure, and by conducting measurement of the portion at which the laser receiving apparatus detected a laser light.

Next, description will be given in regard to the honeycomb structure inspection apparatus including the shape inspection apparatus employing the contact probe according to the embodiment of the present invention.

Figure 10:
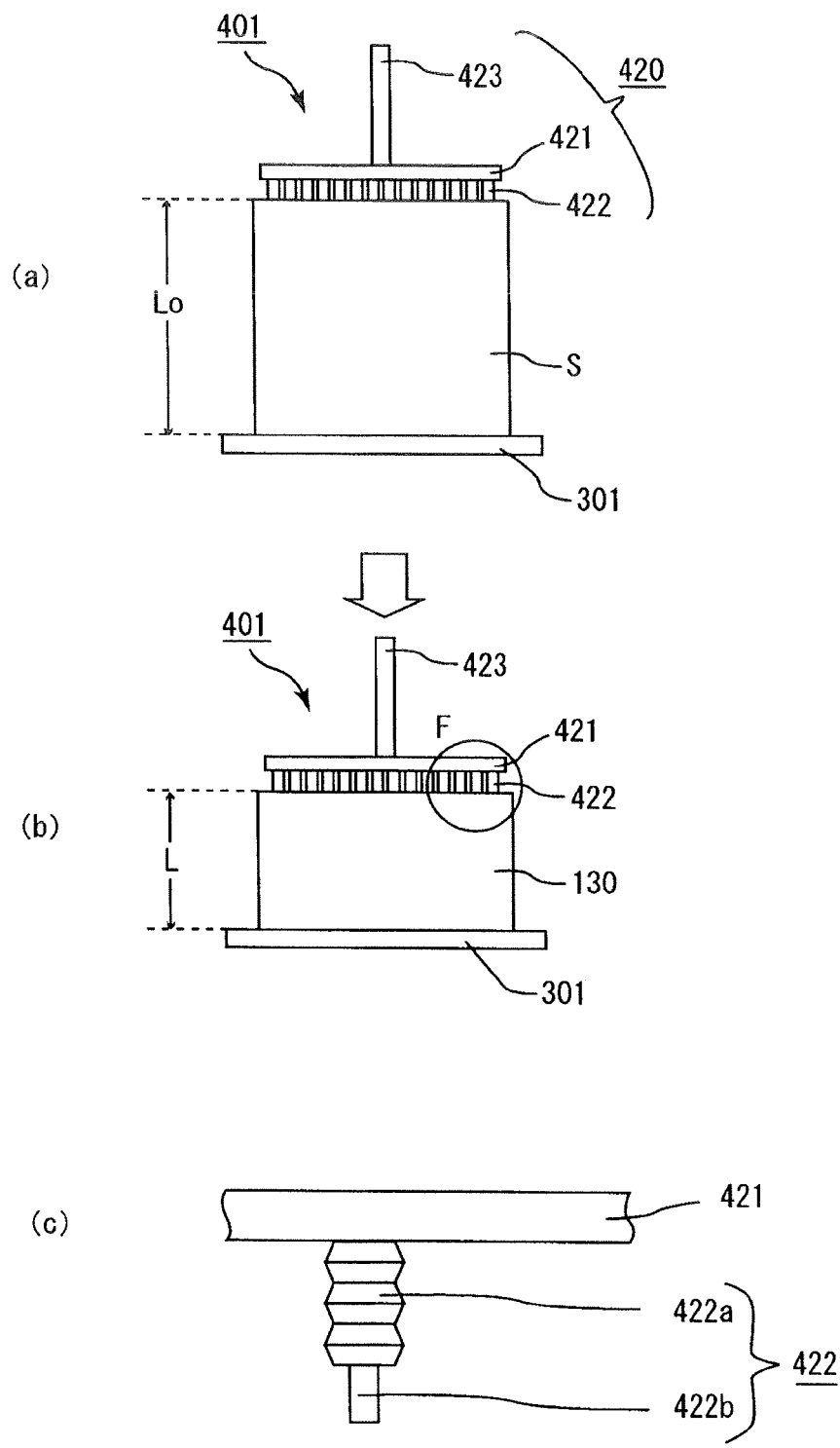
FIGS. 10(a) and 10(b) are conceptual views schematically illustrating an example a shape inspection apparatus employing a contact probe according to the embodiment of the present invention, 10(a) is a front view schematically illustrating a way in which the zero point of the contact probe is corrected employing this shape inspection apparatus.
FIG. 10(c) is a partially enlarged cross-sectional view of a portion indicated by F in FIG. 10(b).

FIGS. 10(a) and 10(b) are conceptual views schematically illustrating an example of a honeycomb structure inspection apparatus. Moreover, the honeycomb structure inspection apparatuses illustrated in FIGS. 10(a) and 10(b) are the same, but the inspection subjects thereof are different.

Also, FIG. 10(c) is a partially enlarged cross-sectional view of the honeycomb structure inspection apparatus illustrated in FIG. 10(b).

As illustrated in FIGS. 10(a) and 10(b), a honeycomb structure inspection apparatus 401 includes a honeycomb structure mounting base 301 according to the embodiment of the present invention, and a shape inspection apparatus 420 having a multitude of approximately bar-shaped contact probes 422 on the bottom face of the disc 421 and having a round pillar-shaped connector portion 423 connected to the center of the disc 421 for sending data from these contact probes 422 and also for supporting the disc 421 and the like.

Also, as illustrated in FIG. 10(c), the contact probe 422 is configured by a variable portion 422a and a tip portion 422b, and is configured in such a manner that the variable portion 422a is depressed after the tip portion 422b has made contact with the inspection subject, and the length of the retraction of the variable portion 422a can be detected.

And although not illustrated in the figures, the other end of the connector portion 423 is connected with an elevating member including an elevatable stepping motor and a ball screw, and the shape inspection apparatus 420 is configured to be moved up and down by the rotation of this stepping motor.

At this, by detecting the rotational position of this stepping motor, it is possible to calculate the distance that the entire shape inspection apparatus 420 including the disc 421 has moved.

Therefore, by detecting the rotational position of the stepping motor when all of the contact probes 422 have detected contact and further detecting the length that the variable portion 422a has retracted in response to the contact probes 422 making contact with the inspection subject, it is possible to detect the position of the portion at which each contact probe has made contact.

Hereinafter, description will be given in regard to a method of conducting inspection of the shape of the honeycomb structure using the honeycomb structure inspection apparatus 401.

When conducting an inspection of the shape of the honeycomb structure using the honeycomb structure inspection apparatus 401, before conducting the actual inspection of the honeycomb structure, a zero point is corrected using a reference sample S as illustrated in FIG. 10(a).

Here, in a measurement system including a reference face and the contact probes 422, the zero point correction is an operation used to decide the position of the origin of the contact probes with respect to the reference face.

Moreover, the term 'reference face' is used to refer to a face on which the honeycomb structure is to be placed, in other words, the structure mounting surface.

As the reference sample S, there is employed a rectangular pillar-shaped sample configured in such a manner that both end faces are parallel to one another, and the length (height) between the end faces is set to be '$L_0$'.

As the procedure of the zero point correction, first, one end face of the reference sample S is placed on the honeycomb structure mounting base 301, as illustrated in FIG. 10(a).

Next, position the other side of the reference sample S so that it may make contact with all of the contact probes 422, and detect the position of the portion at which each contact probe has made contact.

At this time, since all the spaces in between the reference face and the contact probes 422 are expressed as $L_0$, this position is recorded as the position of origin for the respective contact probes.

With the procedure set forth herein above, the zero point correction of the shape inspection apparatus 420 is carried out.

Next, the shape inspection of the honeycomb structure, which is the inspection subject here, is conducted.

First, in place of the reference sample S, one end face of the honeycomb structure 130 (that is the inspection subject here) is placed on the honeycomb structure mounting base 301, as illustrated in FIG. 10(b).

Next, the shape inspection apparatus 420 is lowered to contact the contact probes 422 with the other end face (the end face opposite to the end face contacting the honeycomb structure mounting base) of the honeycomb structure 130. At this time, the shape inspection apparatus 420 is little by little lowered from a position higher than the end face, so that all of the contact probes 422 may contact the end face.

Then, a distance L from the reference face of the contact probes 422 when all of the contact probes 422 have made contact with the end face is expressed by the equation $L=(L_0-X+Y)$, provided that a distance where the shape inspection apparatus 420 has moved from the position of origin is expressed as 'X', and a length that the contact probes have retracted is expressed as 'Y'.

This 'L' is detected for each of the contact probes 422, and the detected values are recorded.

The 'L' detected in this manner is defined as the length of the honeycomb structure in a longitudinal direction at the position at which each contact probe makes contact.

Furthermore, it is possible to measure the degree of parallelism and the degree of position of the end face (see JIS B 0621) from the above calculated length L (calculated using the procedure) in the longitudinal direction of the honeycomb structure in the position at which all of the contact probes have made contact.

The 'degree of parallelism' is the space in between the two planes that are parallel with an unspecified plane, when the entirety of the end face of the honeycomb structure of the side at which the measurement probe makes contact will so as to be sandwiched between the two planes. Also, the 'degree of position' is a space of two parallel planes when the entirety of the end face of the honeycomb structure of the side at which the measurement probe makes contact will exist so as to be sandwiched between the two planes that are symmetrical with respect to a reference face that is parallel with an unspecified flat face, when the reference face has been set to a position separated by a prescribed value (for example, an average value and the like of the measurements in the case of measuring a plurality of lengths in a longitudinal direction) from an unspecified flat face.

The contents of JIS 0621 are incorporated herein by reference in their entirety.

The honeycomb structure inspection apparatus according to the embodiment of the present invention may be configured so as to include both the shape inspection apparatus employing the laser light and the shape inspection apparatus employing the contact probe and thereby use the laser light to conduct measurement of the maximum diameter and the like of the honeycomb structure while using the contact probe to conduct measurement of the length or the like in the longitudinal direction of the honeycomb structure.

Next, description will be given in regard to the honeycomb structure inspection apparatus according to the embodiment including a defect inspection apparatus employing the thermal imaging technique.

The thermal imaging technique is a technique for measuring a temperature distribution of the surface of the honeycomb structure with a thermography and for determining presence of defects using an image visually displaying this temperature distribution while applying a temperature field to the honeycomb structure by a suitable method. Surface defects of the honeycomb structure can be detected with this method.

The honeycomb structure inspection apparatus including the defect inspection apparatus employing the thermal imaging technique includes the honeycomb structure mounting base according to the embodiment of the present invention and a defect inspection apparatus configured by a mechanism for applying the thermal field and a thermography for measuring and displaying the thermal distribution.

The mechanism for applying the thermal field is not particularly limited, and examples thereof include heaters, cooling tubes, hot air blowing apparatuses, cold air blowing apparatuses, and the like.

These mechanisms for applying the thermal field may be disposed on the honeycomb structure mounting base according to the embodiment of the present invention, or may be disposed apart from the same honeycomb structure mounting base.

In a case of conducting inspection of defects of the honeycomb structure using the thermal imaging technique in this honeycomb structure inspection apparatus according to the embodiment of the present invention, the inspection may be conducted by placing the honeycomb structure on the honeycomb structure mounting base, and then conducting measurement of the thermal distribution of the surface of the honeycomb structure with a thermography while applying the thermal field to the honeycomb structure. It is possible to inspect presence of defects on the surface of the honeycomb structure by doing this.

Next, description will be given in regard to the honeycomb structure inspection apparatus according to the embodiment including the defect inspection apparatus using the penetrant inspection technique.

The penetrant inspection technique is an inspection technique (see JIS Z 2343-1 to JIS Z 2343-4) for first applying (by coating or spraying and the like) a liquid penetrant onto the surface of the honeycomb structure allowing the liquid penetrant to penetrate inside surface defects, then cleaning and removing excess liquid penetrant adhering to the surface of the honeycomb structure, afterward applying a developer, and then determining presence of surface defects by a penetrant indicator pattern pertaining to a defect visually enhanced in a clear manner. Surface defects of the honeycomb structure can be detected with this inspection.

The contents of JIS Z 2343-1 to JIS Z 2343-4 are incorporated herein by reference in their entirety.

It is possible to use a dye penetrant inspection technique and a fluorescent penetrant inspection technique as the penetrant inspection. In the dye penetrant inspection, in the case where the developer is applied, when there is a defect indeed present on the surface of the honeycomb structure, a coloration pattern is formed on the portion at which the defect is present on the surface of the honeycomb structure, and from this pattern it is possible to inspect presence of surface defects on the honeycomb structure. In the fluorescent penetrant inspection, in the case where an excitation light such as ultraviolet ray has been applied to the surface of the honeycomb structure when there is a defect indeed present on the surface of the honeycomb structure, a fluorescent pattern will appear on the portion at which the defect is present on the surface of the honeycomb structure, and from this pattern it is possible to inspect presence of surface defects on the honeycomb structure. Also, depending on the case in question, it may be acceptable to omit the developing treatment in the fluorescent penetrant inspection.

Also, since the honeycomb structure mainly includes a porous ceramic, the honeycomb structure that is to be used as the inspection subject in this honeycomb structure inspection apparatus is a honeycomb structure on the side face of which a dense coat layer is formed, and a subject portion for inspecting presence of surface defects is the surface of the coat layer.

The honeycomb structure inspection apparatus including the defect inspection apparatus for the penetrant inspection technique includes a penetrant inspection apparatus including a liquid penetrant supply mechanism, a liquid penetrant remove mechanism and a liquid developer supply mechanism as well as the honeycomb structure mounting base according to the embodiment of the present invention.

Also, in a case in which a fluorescent penetrant inspection is conducted as the penetrant inspection, the penetrant inspection apparatus further includes an excitation light source such as a black light.

In this honeycomb structure inspection method according to the embodiment of the present invention, in a case of conducting the defect inspection of the honeycomb structure by the dye penetrant inspection technique, first, after placing the honeycomb structure on the honeycomb structure mounting base, a liquid penetrant is spray coated and the like over the side face of the honeycomb structure and any excess liquid penetrant (a liquid penetrant that has not penetrated a surface defect) is removed, next, developing treatment is conducted with a developer, and finally the pattern on the side face of the honeycomb structure is observed by visual observation and the like to conduct inspection of the presence of surface defects of the honeycomb structure.

Also, in a case of conducting the defect inspection of the honeycomb structure by the fluorescent penetrant inspection technique, everything up to the point of the removal of the excess liquid penetrant is conducted in the same manner as in the dye penetrant inspection technique, and after having conducted the developing treatment as needed, an excitation light such as an ultraviolet ray or the like is applied to the side face of the honeycomb structure to allow a fluorescent pattern to appear on the surface of the honeycomb structure, and finally this pattern is observed by visual observation and the like to conduct inspection of the presence of surface defects of the honeycomb structure.

Also, the honeycomb structure inspection apparatus according to the embodiment of the present invention may include a magnification microscope or the like as an inspection device. When the honeycomb structure inspection apparatus according to the embodiment of the present invention includes the magnification microscope or the like along with the honeycomb structure mounting base, it is possible to conduct inspection of the external shape of the honeycomb structure by a visual inspection using the magnification microscope.

The honeycomb structure inspection apparatus according to the embodiment of the present invention may include a light source and a light receiving portion for applying light to the entire end face or prescribed cells of a portion of the end face of the honeycomb structure as an inspection device. By using this sort of honeycomb structure inspection apparatus, it is possible to conduct an inspection of the shape of the sealed portion, which is an external shape of the honeycomb structure, by launching light into the cell from the end portion of the side that has not been sealed, and by sensing light leaking through the end portion (hereinafter termed 'sealed portion') of the side that has been sealed to the outside with the light receiving portion.

Also, the honeycomb structure inspection apparatus according to the embodiment of the present invention may include an apparatus for conducting inspection of the internal shape of the honeycomb structure as the inspection device.

For example, it is possible to use a defect inspection apparatus or the like employing an acoustic signal technique as the device for conducting inspection of the internal shape of the honeycomb structure. In a case of using such a honeycomb structure inspection apparatus, it is possible to conduct inspection of the internal shape of the honeycomb structure.

Now, description will be given in regard to the honeycomb structure inspection apparatus according to the embodiment including the defect inspection apparatus using the acoustic signal technique.

The acoustic signal technique is a technique for conducting inspection for internal defects of the honeycomb structure based on acoustic signal information that has transmitted through the honeycomb structure. And with this technique, in a case where the acoustic signal has transmitted through a defective portion of the honeycomb structure, since the acoustic signal will be different from an acoustic signal that has transmitted through a portion of the honeycomb structure having no defects, it is possible to conduct inspection as to the presence of defects in the honeycomb structure by using an information processing apparatus to process an acoustic signal having information pertaining to presence of defects.

The honeycomb structure inspection apparatus including the defect inspection apparatus employing the acoustic signal technique includes the honeycomb structure mounting base according to the embodiment of the present invention, and a defect inspection apparatus including a transmitting probe configured to launch an acoustic signal into the honeycomb structure, a receiving probe configured to receive an acoustic signal that has transmitted through the honeycomb structure, and an information processing apparatus configured to determine presence of defects based on information processing of the acoustic signal received by the receiving probe.

In a case of conducting an inspection of defects of the honeycomb structure with the acoustic signal technique on the honeycomb structure inspection apparatus according to the embodiment of the present invention, the honeycomb structure is placed on the honeycomb structure mounting base, subsequently an acoustic signal is transmitted from the transmitting probe to the receiving probe, the acoustic signal information received by the receiving probe is processed by the information processing apparatus, to thereby determine presence of defects within the honeycomb structure. By doing this, it is possible to detect presence of internal defects within the honeycomb structure.

The honeycomb structure inspection apparatus according to the embodiment of the present invention includes the external shape inspection device such as the shape inspection apparatus employing the laser light or contact probe, or the defect inspection apparatus employing the thermal imaging or penetrant technique; and the internal shape inspection device such as the defect inspection apparatus employing the acoustic signal technique. The honeycomb structure inspection apparatus according to the embodiment of the present invention may include only one of these inspection devices, or may include two or more of these inspection devices.

Also, the honeycomb structure inspection apparatus according to the embodiment of the present invention may conduct inspection for only one of the properties internal shape and external shape, and the honeycomb structure of the present invention may conduct inspection for both of the properties.

Also, besides being able to be used as an inspection apparatus configured to conduct inspection of the internal or external shape of the honeycomb structure as described up to this point, the honeycomb structure inspection apparatus according to the embodiment of the present invention can also be used as an inspection apparatus configured to conduct inspection of at least one of the internal shape and external shape of the honeycomb structure in the midst of a manufacturing process, or as an evaluation apparatus configured to conduct evaluation of the function of either a honeycomb structure before supporting a catalyst or a honeycomb structure after supporting a catalyst.

An example of the inspection apparatus for conducting inspection of the shape of a honeycomb structure in the midst of a manufacturing process includes an inspection apparatus or the like for conducting inspection of the shape of a sealed portion of the kind described above. And an example of the evaluation apparatus for conducting evaluation of the function of a honeycomb structure includes an evaluation apparatus or the like allowing confirmation as to whether or not the honeycomb structure has exhaust gas filtration functionality by setting gases to flow through cells of the honeycomb structure and measuring the pressure of the gas at the inlet side and the outlet side of the cell and then calculating the difference in pressure (pressure drop) therebetween.

In addition, the honeycomb structure inspection apparatus according to the embodiment of the present invention includes the honeycomb structure mounting base according to the embodiment of the present invention, and in the honeycomb structure mounting base, desirably, as described above, the honeycomb structure is supported on the preliminary mounting surface positioned higher than the structure mounting surface, the honeycomb structure is placed on the structure mounting surface by the elevating mechanism lowering the preliminary mounting surface to at least a position of the structure mounting surface, and the preliminary mounting surface is once again raised to a position at least higher than the structure mounting surface by using the elevating mechanism, with the preliminary mounting surface not supporting the honeycomb structure.

In addition, in the honeycomb structure inspection apparatus according to the embodiment of the present invention, desirably, the end face shape of the honeycomb structure and the peripheral shape of the preliminary mounting surface are similar to one another.

In addition, in the honeycomb structure inspection apparatus according to the embodiment of the present invention, desirably, the preliminary mounting surface is donut-shaped, and the structure mounting surface is also disposed in a central portion of the preliminary mounting surface.

The honeycomb structure inspection apparatus according to the embodiment of the present invention, desirably, further including a leg portion attached to an lower portion of the preliminary mounting surface in a radial direction and at equal intervals centered around a center of gravity of the preliminary mounting surface, wherein the preliminary mounting member is desirably configured to be moved up and down with the leg portion running in conjunction with the elevating mechanism.

In this manner, since the honeycomb structure inspection apparatus according to the embodiment of the present invention includes the honeycomb structure mounting base according to the embodiment of the present invention, when placing the honeycomb structure on the honeycomb structure mounting base, it is possible to place the honeycomb structure on the structure mounting surface by contacting the periphery of the end face of the honeycomb structure with the structure mounting surface without putting the periphery of the end face of the honeycomb structure under any strong shock.

Therefore, by using the honeycomb structure inspection apparatus according to the embodiment of the present invention, it is possible to conduct inspection of the shape of the honeycomb structure without generation of chipping, cracking, or the like on the periphery of the end face of the honeycomb structure.

Next, description will be given in regard to the honeycomb structure that is placed on the honeycomb structure mounting base according to the embodiment of the present invention.

The honeycomb structure may be a honeycomb fired body made by firing a honeycomb molded body with a great number of cells placed in rows in a longitudinal direction with a cell wall interposed therebetween, and examples of the honeycomb structure include the honeycomb structure 130, as described below with reference to FIGS. 11, 12(a), and 12(b), for example.

Figure 11:
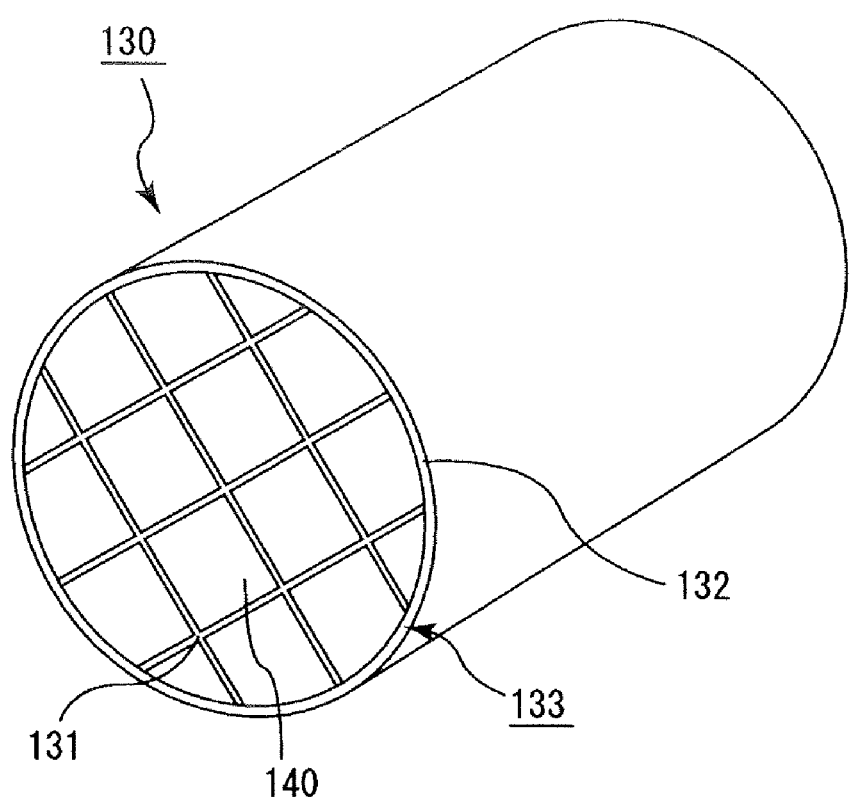
FIG. 11 is a perspective view schematically illustrating an example of a honeycomb structure.

FIG. 11 is a perspective view schematically illustrating an example of a honeycomb structure, FIG. 12(a) is a perspective view schematically illustrating a honeycomb fired body configuring the honeycomb structure, and FIG. 12(b) is a cross-sectional view taken along line A-A of the honeycomb fired body illustrated in FIG. 12(a).

Figure 12:
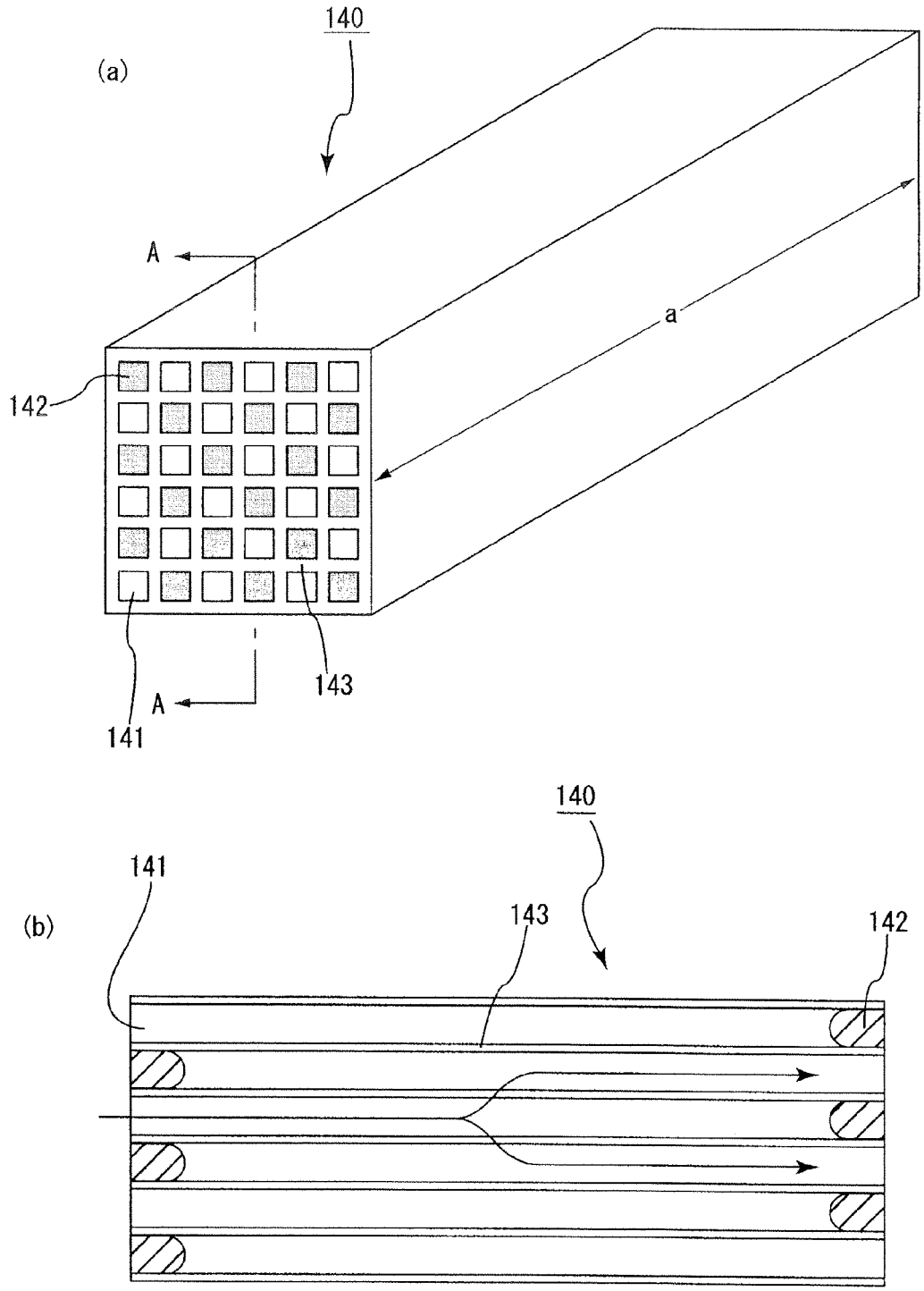
FIG. 12(a) is a perspective view schematically illustrating a honeycomb fired body configuring the honeycomb structure.
FIG. 12(b) is a cross-sectional view of the honeycomb fired body taken along line A-A of FIG. 12 (a).

In a honeycomb structure 130, a plurality of honeycomb fired bodies 140, of the kind illustrated in FIG. 12, are bonded to one another by interposing a sealing material layer (adhesive layer) 131 to form a ceramic block 133, and a sealing material layer (coat layer) 132 is formed on the periphery of the ceramic block 133.

And including the honeycomb fired body 140 are, as illustrated in FIG. 12, a great number of cells 141 placed in parallel in a longitudinal direction (the direction shown by an arrow a in FIG. 12(*a*)), and cell walls 143, which partition the cells 141 individually, and provide filtration functionality.

More specifically, as illustrated in FIG. 12(*b*), the end portion of either the exhaust gas inlet side or the exhaust gas outlet side of the cells 141 formed in the honeycomb fired body 140 is sealed by a plug material layer 142. Therefore, the exhaust gas which enters one cell 141 will always pass through the cell wall 143 dividing the cells 141 to flow out through another one of the cells 141. When the exhaust gas passes through the cell wall 143, particles contained within the exhaust gas are captured by the cell wall 143, to thereby purify the exhaust gas.

Also, the honeycomb structure is not limited to a honeycomb structure (see FIGS. 11, 12(*a*), and 12(*b*)) formed by first firing a pillar-shaped honeycomb molded body with a great number of cells placed in rows in a longitudinal direction with a cell wall interposed therebetween, and bonding a plurality of the obtained honeycomb fired bodies together by interposing a sealing material layer (an adhesive layer), and alternatively, the honeycomb structure may be a cylindrical honeycomb structure such as a single honeycomb sintered body obtained by firing a honeycomb molded body having a large number of cells placed in rows in a longitudinal direction with a cell wall interposed therebetween.

In the present specification, the former honeycomb structure in which a plurality of honeycomb fired bodies are bonded to one another by interposing a sealing material layer (adhesive layer) is referred to as an aggregated honeycomb structure, and the latter round pillar-shaped honeycomb structure such as a single honeycomb sintered body is referred to as an integral honeycomb structure.

Also, the shape of the honeycomb structure is not limited to a round pillar shape as in the honeycomb structure 130 illustrated in FIG. 11, and may be a pillar shape having a bottom face in any shape. More specific examples of such a shape include a triangular pillar shape, a square pillar shape, a hexagonal pillar shape, a polygonal pillar shape, a cylindroid shape, a pillar shape with a racetrack end face, and the like.

Also, the shape of the cells of the honeycomb structure does not necessarily have to be uniform as in the honeycomb structure 130, and the honeycomb structure may include two or more kinds of cells having end portions of differing shapes or sizes.

Also, the honeycomb structure does not necessarily have to have one of the end portions of the cells sealed. More specifically, it is acceptable for both end portions of the cells to be open to the outside.

The honeycomb structure in which one of the end portions of the cells is sealed can be used preferably as a honeycomb filter, while the honeycomb structure in which both end portions of the cells are open to the outside can be used preferably as a catalyst supporting carrier.

Also, examples of the main component of the constituent material of the honeycomb structure include nitride ceramics such as aluminum nitride, silicon nitride, boron nitride, and titanium nitride; carbide ceramics such as zirconium carbide, titanium carbide, tantalum carbide, and tungsten carbide; and oxide ceramics such as alumina, zirconia, cordierite, mullite, and aluminum titanate, and the like.

Out of the possible components, non-oxide ceramics are desirable for use as the main component of the constituent material of the honeycomb structure, and silicon carbide is particularly desirable. This is because they are excellent in thermal resistance properties, mechanical strength, and thermal conductivity. Moreover, silicon-containing ceramics, which contains metallic silicon with the above-mentioned ceramics, and ceramics bound by silicon or silicate compounds can also be used as the constituent material of the honeycomb structure. And out of these, those (silicon-containing silicon carbide) of ceramics containing metallic silicon are preferable.

In particular, it is desirable to use the silicon carbide or the silicon-containing silicon carbide as the main component of the constituent material of the aggregated honeycomb structure, and it is desirable to use cordierite or aluminum titanate as the main component of the constituent material of the integral honeycomb structure.

Next, description will be given in regard to a method for manufacturing the honeycomb structure in the order of successive processes.

Here, description will be conducted citing as an example a case of manufacturing a honeycomb structure having silicon carbide as the main component of the constituent material. Moreover, description will be first given in regard to a method for manufacturing an aggregated honeycomb structure.

First, a mixed powder is prepared by dry mixing an inorganic powder such as silicon carbide powder having different average particle diameters from each other and an organic binder, and mixed liquid is prepared by mixing a liquid plasticizer, lubricant and water. Subsequently, the mixed powder and the mixed liquid are mixed with a wet mixer to prepare a wet mixture for manufacturing a molded body.

A particle diameter of the silicon carbide powder is not particularly limited, but, the silicon carbide powder that tends not to cause the case where the size of the honeycomb structure manufactured by the following firing treatment becomes smaller than that of the honeycomb molded body after degreased is desirable, and for example, a powder prepared by combining 100 parts by weight of powder having an average particle diameter of 0.3 to 50 μm and 5 to 65 parts by weight of powder having an average particle diameter of 0.1 to 1.0 μm is preferred.

In order to adjust the pore diameter and the like of the honeycomb fired body, it is necessary to adjust the firing temperature. The pore diameter can also be adjusted by adjusting the particle diameter of the silicon carbide powder.

The organic binder is not particularly limited, and examples thereof include methylcellulose, carboxymethyl cellulose, hydroxymethyl cellulose, polyethylene glycol, and the like. Methyl cellulose is desirable among them.

Desirably, an amount of the organic binder to be mixed is 1 to 10 parts by weight with respect to 100 parts by weight of the inorganic powder.

The plasticizer is not particularly limited, and examples thereof include glycerin and the like.

Also, the lubricant is not particularly limited, and examples thereof include polyoxyalkylene compounds such as polyoxyethylene alkyl ether, polyoxypropylene alkyl ether and the like.

Examples of the lubricant are not particularly limited and include, for example, polyoxyalkylene compounds such as polyoxyethylene alkyl ether, polyoxypropylene alkyl ether and the like.

Specific examples of the lubricant include, for example, polyoxyethylene monobutyl ether, polyoxypropylene monobutyl ether and the like.

Moreover, there is no necessity that the plasticizer and the lubricant are contained in the mixed raw material powder in some cases.

Also, when preparing the wet mixture, it is acceptable to use a dispersant solution, and examples of the dispersion medium solution include water, organic solvents such as benzene and the like, and alcohols such as methanol and the like.

Further, a molding assistant may be added to the wet mixture.

The molding assistant are not particularly limited, and examples thereof include ethylene glycol, dextrin, fatty acid, fatty acid soap, polyalcohol and the like.

Furthermore, a pore-forming agent such as balloons that are fine hollow spheres including oxide-based ceramics, spherical acrylic particles, and graphite may be added to the moist mixture, if necessary.

The above-mentioned balloons are not particularly limited, and examples thereof include alumina balloons, glass microballoons, shirasu balloons, fly ash balloons (FA balloons), mullite balloons and the like may be used. Alumina balloons are more desirably used among these.

A wet mixture prepared here, in which silicon carbide powder is used, is desirably at a temperature of 28° C. or less. The reason for this is that when the temperature is too high, an organic binder may gel.

A proportion of organic matter in the wet mixture is desirably 10% by weight or less, and a content of water in the wet mixture is desirably 8.0 to 20.0% by weight.

After the preparation, the wet mixture is then conveyed to a molding machine and charged therein.

After the wet mixture, which has been conveyed by a conveyer apparatus, is charged into the molding machine, a honeycomb molded body of prescribed shape is formed by extrusion molding.

Next, the honeycomb molded body is dried using drying apparatuses such as a microwave drying apparatus, a hot-air drying apparatus, a dielectric drying apparatus, a reduced-pressure drying apparatus, a vacuum drying apparatus, and a freeze drying apparatus to form a dried honeycomb molded body.

Thereafter, if necessary, a predetermined amount of plug material paste, which forms plugs, is charged into the end portion on the outlet side of the inlet-side group of cells and the end portion on the inlet side of the outlet-side group of cells so that the cells are sealed. When sealing the cells, a sealing mask is applied to the end face of the honeycomb molded body in such a manner that the plug material paste is charged into prescribed cells that need to be sealed.

The plug material paste is not particularly limited, a plug to be manufactured through subsequent processes desirably has a porosity of 30 to 75%, and for example, it is possible to use a plug material paste having the same composition as the wet mixture.

The plug material paste may be charged as needed, and in a case of having charged the plug material paste it is possible to preferably use the honeycomb structure obtained through subsequent processes as a ceramic filter, and in a case of not having charged the plug material paste it is possible to preferably use the honeycomb structure obtained through subsequent processes as a catalyst supporting carrier.

Next, degreasing (for example, at a temperature of 200 to 500° C.) and then firing (for example, at a temperature of 1400 to 2300° C.) are carried out on the honeycomb molded body filled in with the plug material paste under predetermined conditions so that a honeycomb fired body (see FIG. 12(b)), the entire portion of which is formed by a single fired body having a plurality of cells each placed in rows with a cell wall therebetween in the longitudinal direction, with either one of the ends of each cell plugged, is manufactured.

The conditions under which degreasing and firing are executed to the honeycomb molded body can be the same conditions that have been used conventionally when manufacturing a filter made of a porous ceramic.

Next, the sealing material paste that will serve as the sealing material layer (the adhesive layer) is coated on the side of the honeycomb fired body at a uniform thickness to form the sealing material paste layer. On top of this sealing material paste layer, the process of sequentially piling up other honeycomb fired bodies is carried out repeatedly, thereby manufacturing an aggregate of honeycomb fired bodies of a prescribed size.

Examples of the sealing material paste include a material including inorganic fibers and/or inorganic particles in addition to an inorganic binder and an organic binder.

Examples of the inorganic binder include silica sol, alumina sol, and the like. These may be used alone or two or more kinds of these may be used in combination. Silica sol is desirable among the inorganic binder.

Examples of the organic binder include polyvinyl alcohol, methyl cellulose, ethyl cellulose, carboxymethyl cellulose, and the like. These may be used alone or two or more kinds of these may be used in combination. Carboxymethyl cellulose is desirable among the organic binders.

Examples of the inorganic fibers include ceramic fibers such as silica-alumina, mullite, alumina, silica and the like, for example. These may be used alone or two or more kinds of these may be used in combination. Alumina fibers are desirable among the inorganic fibers.

Examples of the inorganic particles include carbide, nitride, and the like, and more specific examples of the inorganic particles include inorganic powder and the like including silicon carbide, silicon nitride, boron nitride, and the like. These may be used alone or two or more kinds of these may be used in combination. Silicon carbide having an excellent thermal conductivity is desirably used among the inorganic particles.

Furthermore, a pore-forming agent such as balloons that are fine hollow spheres made of oxide-based ceramics, spherical acrylic particles, and graphite may be added to the sealing material paste, if necessary.

The balloon is not particularly limited, and examples thereof include alumina balloon, glass micro balloon, shirasu balloon, fly ash balloon (FA balloon), mullite balloon and the like. Alumina balloon is desirable among these.

Next, this aggregate of honeycomb fired bodies is heated to dry and solidify the sealing material paste layer, thereby forming the sealing material layer (the adhesive layer).

Next, using a diamond cutter or the like, a cutting process is carried out on the aggregate of the honeycomb fired bodies in which a plural of honeycomb fired bodies are combined with one another by interposing the sealing material layer (the adhesive layer), thereby manufacturing a round pillar-shaped ceramic block.

Afterward, another sealing material layer (a coat layer) is formed by coating the sealing material paste over the peripheral portion of the ceramic block. Thereby manufacturing a honeycomb structure having the sealing material layer (the coat layer) disposed on the outer peripheral portion of a round pillar-shaped ceramic block formed of a plurality of honeycomb fired bodies adhered together by the sealing material layer (the adhesive layer).

In the method for manufacturing the honeycomb structure, afterward, according to necessity, a catalyst may be supported on the honeycomb structure. In addition, the above-mentioned supporting of a catalyst may be applied to the honeycomb fired body prior to preparing the aggregated body.

When the honeycomb structure supports a catalyst, an alumina film having a high specific surface area is desirably formed on the surface of the honeycomb structure and a co-catalyst and a catalyst such as platinum and the like are provided for the surface of this alumina film.

Examples of the method for forming the alumina film on the surface of the honeycomb structure include: a method in which the honeycomb structure is impregnated with a solution of a metal compound containing aluminum such as $Al(NO_3)_3$ and then heated; a method in which the honeycomb structure is impregnated with a solution containing alumina powder, and then heated; and the like.

Examples of the method for applying a co-catalyst to the alumina film include a method in which the honeycomb structure is impregnated with a solution of a metal compound containing rare earth elements such as $Ce(NO_3)_3$ and then heated, and the like.

Examples of the method for applying a catalyst to the alumina film include a method in which the honeycomb structure is impregnated with a solution of diamine dinitro platinum nitric acid ($[Pt(NH_3)_2(NO_2)_2]HNO_3$, platinum concentration: 4.53% by weight) and then heated, and the like.

Furthermore, the catalyst may be applied through a method in which a catalyst is applied to an alumina particle in advance, to impregnate the honeycomb structure with a solution containing alumina powder applied with the catalyst, and heat it thereafter.

The method for manufacturing the honeycomb structure described up to this point is a method for manufacturing the aggregated honeycomb structure. Hereinafter, a method for manufacturing the integral honeycomb structure will be described.

In a case of manufacturing this sort of integral honeycomb structure, a honeycomb molded body is manufactured in the same manner as in the case of manufacturing the aggregated honeycomb structure, except that the size of the honeycomb molded body formed by extrusion molding is larger in comparison to a case of manufacturing the aggregated honeycomb structure.

Next, in the same manner as in the manufacture of the aggregated honeycomb structure, the honeycomb molded body is dried using drying apparatuses such as a microwave drying apparatus, a hot-air drying apparatus, a dielectric drying apparatus, a reduced-pressure drying apparatus, a vacuum drying apparatus, and a freeze drying apparatus.

Next, a cutting process of cutting both end portions of the dried honeycomb molded body is carried out.

Thereafter, a predetermined amount of plug material paste, which forms plugs, is charged into the end portion on the outlet side of the inlet-side group of cells and the end portion on the inlet side of the outlet-side group of cells so that the cells are sealed.

Thereafter, in the same manner as in the case of manufacturing the aggregated honeycomb structure, the degreasing and firing processes are carried out to manufacture a ceramic block, and the sealing material layer (coat layer) is formed according to need so that an integral honeycomb structure is manufactured. Moreover, a catalyst may be supported on the integral honeycomb structure by using the above-mentioned method.

The honeycomb structure manufactured in this manner is used as the honeycomb structure to be placed on the honeycomb structure mounting base according to the embodiment of the present invention, and the inspection subject of the honeycomb structure inspection apparatus according to the embodiment of the present invention.

EXAMPLES

Example 1

Hereinafter, examples are given to describe the present invention in further detail. The present invention is not limited to these examples.

In the present example, first, a honeycomb structure was manufactured by the method set forth below, and this honeycomb structure was inspected by the techniques of Examples 1 to 6 and Comparative Examples 1 to 3.

(Manufacture of the Honeycomb Structure)

First, 250 kg of an α-type silicon carbide powder having an average particle diameter of 10 μm, 100 kg of an α-type silicon carbide powder having a average particle diameter of 0.5 μm, and 20 kg of an organic binder (methylcellulose) were blended to prepare a powder mixture.

Next, 12 kg of a lubricating agent (UNILUB, manufactured by NOF Corp.), 5 kg of a plasticizer (glycerin), and 65 kg of water were blended in a separate container to prepare a liquid mixture. Next, using a wet mixing machine, the liquid mixture and the powder mixture were blended, thereby preparing the wet mixture.

Next, using a conveyer apparatus, this wet mixture was conveyed to and charged into an extrusion molding machine.

Then, a molded body having the same shape as that of the molded body illustrated in FIGS. 12(a) and 12(b) was manufactured, except that end portions of the cells were not sealed.

Next, after using a microwave drying apparatus or the like to dry the molded body, a prescribed amount of a plug material paste of the same composition as the wet mixture was charged into prescribed cells.

Next, after carrying out another drying treatment using a drying apparatus, degreasing was executed at 400° C., and firing was executed for three hours at atmospheric pressure in an argon atmosphere at 2200° C., thereby manufacturing a honeycomb fired body as a silicon carbide fired body having a porosity of 40 percent, an average pore diameter of 12.5 μm, a size of 34.3 mm×34.3 mm×150.5 mm, a cell count (cell density) of 46.5 pcs/cm², and a cell wall thickness of 0.20 mm.

Next, a round pillar-shaped ceramic block with a 1 mm thick sealing material layer (the adhesive layer) was manufactured by adhering a multitude of honeycomb fired bodies using a heat-resistant sealing material paste containing 30% by weight of alumina fibers with an average fiber length of 20 μm, 21% by weight of silicon carbide powder having an average particle diameter of 0.6 μm, 15% by weight of silica sol, 5.6% by weight of carboxymethylcellulose, and 28.4% by weight of water, drying at a temperature of 120° C., and conducting cutting using a diamond cutter.

Next, a sealing material paste was prepared by mixing and kneading together 23.3% by weight of silica alumina fiber (an average fiber length: 100 μm, and an average fiber diameter: 10 μm) as inorganic fibers, 30.2% by weight of silicon carbide powder having an average particle diameter of 0.3 μm as inorganic particles, 7% by weight of silica sol ($SiO_2$ content within the sol: 30% by weight) as an inorganic binder, 0.5% by weight of carboxymethylcellulose as an organic binder and 39% by weight of water.

Next, using the sealing material paste, a sealing material paste layer with a thickness of 0.2 mm was formed over the peripheral portion of the ceramic block. This sealing material paste layer was then dried at a temperature of 120° C. to manufacture a round pillar-shaped honeycomb structure with a diameter of 143.8 mm×a length of 254 mm having a sealing material layer (a coat layer) formed on the periphery thereof.

Example 1

Using the honeycomb structure inspection apparatus (see FIGS. 9(a) to 9(c)) including the honeycomb structure mounting base 301 illustrated in FIGS. 3 to 6 and the shape inspection apparatus employing a laser light, the external shape of the honeycomb structure was inspected with respect to 100 sample units of the honeycomb structure manufactured by the above-mentioned process.

The specific configuration of the honeycomb structure mounting base 301 is as follows.

The mounting member 302, having a top face diameter of 250 mm, is shaped like a disc and has a groove portion for a preliminary mounting member 310 and a groove portion for a leg portion 311 on its top face. Therefore, the structure mounting surface 302a has a shape configured to make contact with the entire periphery of end face of the honeycomb structure.

The preliminary mounting member 303 is donut-shaped and has a width of 15 mm, an outer circumferential diameter of 100 mm, and an inner circumferential diameter of 70 mm. The preliminary mounting surface has a shape allowing an entire periphery of the preliminary mounting surface to exist inside an end face of the periphery of the honeycomb structure in a case of superimposing the preliminary mounting surface 303a onto an end face of the honeycomb structure. Also, the top face of the preliminary mounting member 303 is flattened, and is disposed in such a manner that the preliminary mounting surface 303a and the structure mounting surface 302a are parallel to one another. Also, the preliminary mounting member 303 includes a fluororesin.

The leg portion 304 is disposed in such a manner that five leg portions are fixed to the bottom portion of the preliminary mounting member at equal intervals. Therefore, all of the angles formed at adjacently positioned leg portions are 72°.

Also, there are four units of the air cylinder 309 provided herein as the cylinders for moving the elevating mechanism up and down.

The specific inspection procedure used in the present Example was as follows: first, the honeycomb structure was supported on the preliminary mounting surface 303a with the preliminary mounting surface 303a being positioned higher than the structure mounting surface 302a, then the preliminary mounting surface 303a was lowered to a position of the structure mounting surface 302a by using the elevating mechanism to finally place the honeycomb structure on the structure mounting surface 302a. At this time, a velocity at which the preliminary mounting surface was lowered was 30 mm/s.

While in the above state, a laser light was applied from laser irradiation apparatuses 411a, 411b illustrated in FIG. 9(a) at an angle of 90° with respect to the front face of the irradiation apparatus, and a width of the light that reached laser light receiving apparatuses 412a, 412b was measured.

At this time, measurement was conducted while rotating the honeycomb structure intermittently, and the maximum diameter (diameter) of the end face of the honeycomb structure was calculated.

Also, after rotating the honeycomb structure one full rotation (360° rotation), the height of the portion to be measured was varied, and the diameter of each of the honeycomb structures was measured five times. Based on the results of the measurement, a maximum diameter (diameter), a degree of roundness, and a degree of squareness of the honeycomb structures were calculated.

Example 2

Using the honeycomb structure inspection apparatus (see FIGS. 10(a) to 10(c)) including the same honeycomb structure mounting base 301 as in Example 1 and the shape inspection apparatus employing a contact probe, the external shape of the honeycomb structure was inspected. Here, the inspection was conducted with respect to 100 sample units of the honeycomb structure.

More specifically, after placing the honeycomb structure on the honeycomb structure mounting base 301 in the same manner as in Example 1, measurement was conducted of a length in a longitudinal direction of the honeycomb structure, a degree of parallelism and a degree of position of the end face, using the shape inspection apparatus 420 including a plurality of contact probes 422 illustrated in FIGS. 10(a) to 10(c).

Specifically, on the end face of the honeycomb structure, measurement was conducted of a length of the honeycomb structure and the like in a manner of positioning a single contact probe 422 to a portion occupied by the end face of a single honeycomb structure.

Example 3

Using the honeycomb structure inspection apparatus including the same honeycomb structure mounting base 301 as in Example 1 and the defect inspection apparatus employing the thermal imaging technique, the external shape of the honeycomb structure was inspected. Moreover, in the present Example, the inspection was conducted with respect to 100 sample units of the honeycomb structure.

Specifically, in this inspection, after the honeycomb structure was placed on the honeycomb structure mounting base 301 in the same manner as in Example 1, hot air heated to 100° C. was blown to the honeycomb structure for five minutes. After stopping the blowing of the hot air, the face blown with the hot air was positioned toward a thermography measurement face and the measurement image thereof was observed, and it was determined whether or not points or lines existed where the temperature distribution was not continuous to thereby inspect whether or not defects are present on the surface of the honeycomb structure.

Example 4

Using the honeycomb structure inspection apparatus including the same honeycomb structure mounting base 301 as in Example 1 and the defect inspection apparatus employing a dye penetrant inspection, the external shape of the honeycomb structure was inspected. Moreover, in the present Example, the inspection was conducted with respect to 100 sample units of the honeycomb structure.

Specifically, in this inspection, first, the honeycomb structure was placed on the honeycomb structure mounting base 301 in the same manner as in Example 1.

Next, a red liquid penetrant was spray misted to the honeycomb structure, and kept standing for 15 minutes after which excess red liquid penetrant adhering to the honeycomb structure was washed away with water.

Finally, a white powder suspension fluid serving as a developer was spray misted to the honeycomb structure, and the surface of the honeycomb structure was observed as to whether or not the color red showed up to thereby inspect whether or not surface defects are present on the honeycomb structure.

Example 5

Using the honeycomb structure inspection apparatus including the same honeycomb structure mounting base 301 as in Example 1 and the defect inspection apparatus employing a fluorescent penetrant inspection, the external shape of the honeycomb structure was inspected. Moreover, in the present Example, the inspection was conducted with respect to 100 sample units of the honeycomb structure.

Specifically, in this inspection, first, the honeycomb structure was placed on the honeycomb structure mounting base 301 in the same manner as in Example 1.

Next, a fluorescent fluid was spray misted to the honeycomb structure, kept standing for 30 minutes, and thereafter excess fluorescent fluid adhering to the honeycomb structure was washed away with water.

Finally, after the inspection room where the inspection apparatus was situated was set to function as a dark room, a black light was used for irradiating the honeycomb structure to allow the fluorescent light to glow, and the glow pattern was observed to thereby inspect whether or not surface defects are present on the honeycomb structure.

Example 6

Using the honeycomb structure inspection apparatus including the same honeycomb structure mounting base 301 as in Example 1 and the inspection apparatus employing an acoustic signal inspection technique, the internal shape of the honeycomb structure was inspected. Moreover, in the present Example, the inspection was conducted with respect to 100 sample units of the honeycomb structure.

Specifically, in this inspection, first, the honeycomb structure was placed on the honeycomb structure mounting base 301 in the same manner as in Example 1.

Next, an acoustic signal enters the honeycomb structure from the transmitting probe provided on the internal defect inspection apparatus, and this acoustic signal having transmitted through the honeycomb structure was received by the receiving probe, and information of this received acoustic signal was processed with the information processing apparatus to thereby determine the presence of defects.

This determination was carried out continuously while moving both probes to thereby inspect the presence of defects throughout the interior of the honeycomb structure.

Example 7

Using the honeycomb structure inspection apparatus including the honeycomb structure mounting base 331 illustrated in FIGS. 7(a), 7(b), 8(a), and 8(b) and a honeycomb structure inspection apparatus including a shape inspection apparatus employing a laser light, the external shape of the honeycomb structure was inspected. Accordingly, the honeycomb structure inspection apparatus used in the present Example was configured in such a manner that the mounting member was moved up and down.

Moreover, in the present Example, the inspection was conducted with respect to 100 sample units of the honeycomb structure. Also, the inspection device used here was the same as that used in Example 1.

The specific configuration of the honeycomb structure mounting base 331 is as follows.

The mounting member 332, having a top face diameter of 250 mm, is shaped like a disc and has a groove portion for a preliminary mounting member and a groove portion for a leg portion on the top face thereof. Therefore, the structure mounting surface 332a has a shape configured to contact the entire periphery of the end face the honeycomb structure.

Also, the mounting member 332 is configured to be integrated with a metal plate 336 fitted to the bottom face thereof, and further fitted on the bottom face of the metal plate 336 are four air cylinders 339 fitted through a cylinder plate 337 and a rod 338.

The donut-shaped preliminary mounting member 333 has a width of 15 mm, an outer circumferential diameter of 100 mm, and an inner circumferential diameter of 70 mm. This is a shape configured in such a manner that the entire periphery of the preliminary mounting surface exists inside the periphery of the honeycomb structure in a case of superimposing the preliminary mounting surface 333a onto an end face of the honeycomb structure. Also, the top face of the preliminary mounting member 333 is flattened, and is situated in such a manner that the preliminary mounting surface 333a and the structure mounting surface 332a are parallel to one another. Also, the preliminary mounting member 333 includes a fluororesin.

Also, a preliminary mounting member 333 is situated at a prescribed height by fixation legs 335 through five leg portions 334. Moreover, the five leg portions 334 are fixed to the bottom portion of the preliminary mounting member at equal intervals. Therefore, all of the angles formed at adjacently positioned leg portions are 72°.

The specific inspection procedure used in the present Example was as follows: first, the honeycomb structure was supported on the preliminary mounting surface 333a positioned higher than the structure mounting surface 332a, then the structure mounting surface 332a was raised to a position of the preliminary mounting surface 333a by the elevating mechanism, the honeycomb structure is placed on the structure mounting surface 332a, and thereafter a maximum diameter (diameter), a degree of roundness, and a degree of squareness were calculated by the same procedure used in Example 1.

Comparative Example 1

Using the honeycomb structure inspection apparatus including the honeycomb structure mounting base having the following configuration and the shape inspection apparatus employing a laser light, the external shape of the honeycomb structure was inspected in the same manner as in Example 1. Moreover, in the present Comparative Example, the inspection was conducted with respect to 100 sample units of the honeycomb structure.

In the present Comparative Example, a honeycomb structure inspection apparatus including a rectangular ring-shaped preliminary mounting member with a ring width of 15 mm, an outer length of a longer side of 150 mm, a length of a shorter side of 100 mm was used as the honeycomb structure inspection apparatus. With this preliminary mounting member, when the preliminary mounting surface is superimposed onto the end face of the honeycomb structure, a portion of the periphery of the preliminary mounting surface exists outside of the periphery of the end face of the honeycomb structure.

Also, the top face of the preliminary mounting member is flattened, and the preliminary mounting surface and the structure mounting surface are situated so as to be parallel to one another. The preliminary mounting member includes a fluororesin.

Also, in the honeycomb structure mounting base, the leg portions are fixed to the lower portion of the preliminary mounting member, each fixed thereto at the center of each of the four sides of the preliminary mounting member, and these leg portions have the same shape as those of the honeycomb structure mounting base 301 used in Example 1.

Also, the circular mounting member of the honeycomb structure mounting base has a top face diameter of 250 mm, and the shapes of the groove portion for a preliminary mounting member and the groove portion for a leg portion are approximately the same as the plan view shape of the preliminary mounting member and the leg portion.

Aside from this, the configurations of a shaft, a metal plate, a cylinder plate, and a cylinder are also the same as those of the honeycomb structure mounting base 301 used in Example 1.

In the present comparative example, the honeycomb structure was supported on the preliminary mounting surface in such a manner that the center of gravity of the end face of the honeycomb structure is approximately identical to the center of gravity of the preliminary mounting surface. At this time, a portion of the top face of the preliminary mounting member made contact with the periphery of the end face of the honeycomb structure.

After that, the preliminary mounting surface is lowered by the elevating mechanism to a position of the structure mounting surface to place the honeycomb structure on the structure mounting surface in the same manner as in Example 1, and further, inspection was conducted of the external shape of the honeycomb structure, and a maximum diameter (diameter), a degree of roundness, and a degree of squareness were calculated in the same manner as in Example 1.

Comparative Example 2

Using the honeycomb structure inspection apparatus including the honeycomb structure mounting base having the following configuration and the shape inspection apparatus including a laser irradiation apparatus and a light receiving apparatus, the external shape of the honeycomb structure was inspected in the same manner as in Example 1. Moreover, in the present Comparative Example, the inspection was conducted with respect to 100 sample units of the honeycomb structure.

In the present comparative example, although the honeycomb structure mounting base has approximately the same configuration as the honeycomb structure mounting base 301 used in Example 1, a honeycomb structure mounting base in which the configuration of the top face of the preliminary mounting member differs in that it has a shape slanted 3° with respect to the bottom face of the preliminary mounting member was used as the honeycomb structure mounting base here. Therefore, in this honeycomb structure mounting base, the preliminary mounting surface is slanted 3° with respect to the structure mounting surface.

In the present comparative example, the honeycomb structure is supported on the preliminary mounting surface, and then the preliminary mounting surface is lowered by the elevating mechanism in a manner such that the honeycomb structure makes contact with the structure mounting surface. At this time, the periphery of the end face of the honeycomb structure initially made contact with the structure mounting surface at a point.

Afterward, inspection was conducted of the external shape of the honeycomb structure in the same manner as in Example 1, and the maximum diameter (diameter), a degree of roundness, and a degree of squareness of the honeycomb structure were calculated.

Comparative Example 3

Using a honeycomb structure inspection apparatus which includes a honeycomb structure mounting base including a 10 mm thick stainless (SUS) flat plate having a round top face with a diameter of 250 mm and a shape inspection apparatus employing a laser light, the external shape of the honeycomb structure was inspected. In the present Example, the inspection was conducted with respect to 100 sample units of the honeycomb structure.

In the present Comparative Example, an end face of the honeycomb structure was positioned downward, and this honeycomb structure was placed on the flat plate. Afterward, the external shape of the honeycomb structure was inspected in the same manner as in Example 1, and a maximum diameter (diameter), a degree of roundness, and a degree of squareness of the honeycomb structure were calculated.

(Result of Inspection)

In the inspection of the honeycomb structure in Examples 1 to 7 and Comparative Examples 1 to 3, inspection was conducted of each of the characteristics to be inspected (that is, a length, a degree of roundness, a degree of squareness, presence of surface defects, presence of internal defects, of the honeycomb structure) by the inspection method.

However, after completion of the inspection, the honeycomb structures were removed from the honeycomb structure mounting bases in order to conduct visual observation of the end face (mainly the periphery of the end face) of the honeycomb structure making contact with the honeycomb structure mounting base. This observation yielded the following results.

Specifically, in the inspections conducted in Examples 1 to 7, after completion of the inspection, no generation of chipping, cracking, or the like was observed on the periphery of the end face of the honeycomb structure.

In contrast to this, generation of chipping or cracking were observed on the periphery of the end face of the honeycomb structure in four honeycomb structure samples (occurrence rate: 4%) in the inspection conducted in Comparative Example 1, in eight honeycomb structure samples (occurrence rate: 8%) in the inspection conducted in Comparative Example 2, and in nine honeycomb structure samples (occurrence rate: 9%) in the inspection conducted in Comparative Example 3.

The reason for this is presumably that since in Comparative Example 1, the periphery of the end face of the honeycomb structure initially made contact with the preliminary mounting member at a point, in Comparative Example 2, the periphery of the end face of the honeycomb structure initially made contact with the mounting member at a point, and in Comparative Example 3, the periphery of the end face of the honeycomb structure initially made contact with the flat plate at a point, these contacts may put the periphery of the end face of the honeycomb structures under strong shock, leading to generation of chipping, cracking and the like, on the periphery of the end face of the honeycomb structures.

In contrast to this, in Examples 1 to 7, when supporting the honeycomb structure on the preliminary mounting surface, the entire periphery of the end face of the honeycomb structure contacts the top face of the mounting member simultaneously without putting the periphery of the end face of the honeycomb structure under strong shock. This presumably caused no generation of chipping, cracking, or the like on the periphery of the end face of the honeycomb structure.

From this, it became clear that with respect to the inspection apparatus including the honeycomb structure mounting base according to the embodiment of the present invention it is possible to conduct inspection of the shape of the honeycomb structure without chipping, cracking, or the like being generated on the periphery of the end face of the honeycomb structure.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A honeycomb structure mounting base, comprising:
    a mounting member having a structure mounting surface configured to contact an entire end face of a honeycomb structure including a periphery of the honeycomb structure;
    a preliminary mounting member having a preliminary mounting surface configured to have said honeycomb structure placed thereon before placement of said honeycomb structure on said mounting member; and
    an elevating mechanism configured to move said preliminary mounting member up and down in relation to said mounting member,
    said preliminary mounting surface being parallel to said structure mounting surface,
    said preliminary mounting surface having a shape allowing an entire periphery of the preliminary mounting surface to exist inside a periphery of the end face of said honeycomb structure in a case of superimposing said preliminary mounting surface onto an end face of said honeycomb structure.

2. The honeycomb structure mounting base according to claim 1,
    wherein said honeycomb structure is supported on said preliminary mounting surface positioned higher than said structure mounting surface,
    said elevating mechanism lowers said preliminary mounting surface to at least a position of said structure mounting surface, and thereby said honeycomb structure is placed on said structure mounting surface, and
    said preliminary mounting surface is once again raised to a position at least higher than said structure mounting surface by using said elevating mechanism, with said preliminary mounting surface not supporting said honeycomb structure.

3. The honeycomb structure mounting base according to claim 1,
    wherein the end face shape of said honeycomb structure and the peripheral shape of said preliminary mounting surface are similar to one another.

4. The honeycomb structure mounting base according to claim 1,
    wherein said preliminary mounting surface is donut-shaped, and
    said structure mounting surface is also disposed in a central portion of said preliminary mounting surface.

5. The honeycomb structure mounting base according to claim 1, further comprising:
    a leg portion attached to a lower portion of said preliminary mounting surface in a radial direction and at equal intervals centered around a center of gravity of said preliminary mounting surface;
    wherein said preliminary mounting member is configured to be moved up and down with said leg portion running in conjunction with said elevating mechanism.

6. A honeycomb structure inspection apparatus, comprising:
    a honeycomb structure mounting base comprising a mounting member having a structure mounting surface configured to contact an entire end face of a honeycomb structure including a periphery of the honeycomb structure, a preliminary mounting member having a preliminary mounting surface configured to have said honeycomb structure placed thereon before placement of said honeycomb structure on said mounting member, and an elevating mechanism configured to move said preliminary mounting member up and down in relation to said mounting member; and
    an inspection device configured to conduct inspection of at least one of an external shape and an internal shape of said honeycomb structure placed on said mounting member,
    said preliminary mounting surface being parallel to said structure mounting surface,
    said preliminary mounting surface having a shape allowing an entire periphery of the preliminary mounting surface to exist inside a periphery of the end face of said honeycomb structure in a case of superimposing said preliminary mounting surface onto an end face of said honeycomb structure.

7. The honeycomb structure inspection apparatus according to claim 6,
    wherein said honeycomb structure is supported on said preliminary mounting surface positioned higher than said structure mounting surface,
    said honeycomb structure is placed on said structure mounting surface by said elevating mechanism lowering said preliminary mounting surface to at least a position of said structure mounting surface, and
    said preliminary mounting surface is once again raised to a position at least higher than said structure mounting surface by using said elevating mechanism, with said preliminary mounting surface not supporting said honeycomb structure.

8. The honeycomb structure inspection apparatus according to claim 6,
    wherein the end face shape of said honeycomb structure and the peripheral shape of said preliminary mounting surface are similar to one another.

9. The honeycomb structure inspection apparatus according to claim 6,
    wherein said preliminary mounting surface is donut-shaped, and
    said structure mounting surface is also disposed in a central portion of said preliminary mounting surface.

10. The honeycomb structure inspection apparatus according to claim 6, further comprising:
    a leg portion attached to an lower portion of said preliminary mounting surface in a radial direction and at equal intervals centered around a center of gravity of said preliminary mounting surface,
    wherein said preliminary mounting member is configured to be moved up and down with said leg portion running in conjunction with said elevating mechanism.

11. The honeycomb structure inspection apparatus according to claim 6,
    wherein said inspection device is configured to conduct inspection of the external shape of said honeycomb structure, and said external shape includes at least one property selected from the group consisting of: length in a longitudinal direction, a maximum diameter, a degree of roundness, a degree of squareness, a degree of parallelism, and a degree of position, of said honeycomb structure.

12. The honeycomb structure mounting base according to claim 1, further comprising a rotating table at a bottom of the honeycomb structure mounting base.

13. The honeycomb structure mounting base according to claim 1,
wherein the honeycomb structure mounting base is utilized in:
an inspection apparatus configured to conduct inspection of at least one of an internal shape and an external shape of the honeycomb structure during or after a manufacturing process of the honeycomb structure, or
an evaluation apparatus configured to conduct evaluation of a function of at least one of the honeycomb structure having a catalyst and the honeycomb structure not having a catalyst.

14. The honeycomb structure inspection apparatus according to claim 6,
wherein the inspection device is configured to conduct inspection of one of the external shape and the internal shape of the honeycomb structure.

15. The honeycomb structure inspection apparatus according to claim 14,
wherein the inspection device comprises at least one of:
a shape inspection apparatus employing a laser light or a contact probe; and
a defect inspection apparatus employing thermal imaging or penetrant inspection techniques.

16. The honeycomb structure inspection apparatus according to claim 15,
wherein the shape inspection apparatus employing a laser light comprises,
at least two laser irradiation apparatuses each having a light source,
at least two laser receiving apparatuses each having a light receiving portion to receive a light from the light source, and
a support member which is configured to support the laser irradiation apparatuses and the laser receiving apparatuses on the honeycomb structure mounting base, and
wherein the honeycomb structure mounting base is so constructed that the honeycomb structure is disposed between the irradiation apparatuses and the laser receiving apparatuses when the honeycomb structure is provided on the honeycomb structure mounting base.

17. The honeycomb structure inspection apparatus according to claim 16,
wherein the honeycomb structure mounting base comprises a rotating table which is configured to rotate the mounting member and the preliminary mounting member, and
wherein the honeycomb structure inspection apparatus is configured to conduct an inspection with rotating the honeycomb structure intermittently and changing a height at a portion to be inspected.

18. The honeycomb structure inspection apparatus according to claim 15,
wherein the shape inspection apparatus employing a contact probe comprises,
a disc,
a multitude of approximately bar-shaped contact probes which are provided on a bottom face of the disc, and
a connector portion which supports the disc and is connected to the disc for sending data from the contact probes.

19. The honeycomb structure inspection apparatus according to claim 15,
wherein the defect inspection apparatus employing thermal imaging technique comprises,
a mechanism configured to apply a thermal field to the honeycomb structure, and
a thermography configured to measure and display a thermal distribution on the honeycomb structure.

20. The honeycomb structure inspection apparatus according to claim 15,
wherein the defect inspection apparatus employing penetrant inspection techniques is configured to conduct at least one of a dye penetrant inspection and a fluorescent penetrant inspection.

21. The honeycomb structure inspection apparatus according to claim 20,
wherein the defect inspection apparatus comprises a liquid penetrant supply mechanism, a liquid penetrant remove mechanism, and a liquid developer supply mechanism.

22. The honeycomb structure inspection apparatus according to claim 21,
wherein the defect inspection apparatus further comprises an excitation light source.

23. The honeycomb structure inspection apparatus according to claim 14,
wherein the inspection device is configured to conduct an inspection of the internal shape of the honeycomb structure by employing an acoustic signal technique.

24. The honeycomb structure inspection apparatus according to claim 23,
wherein the inspection device comprises,
a transmitting probe configured to launch an acoustic signal into the honeycomb structure,
a receiving probe configured to receive an acoustic signal which is transmitted through the honeycomb structure, and
an information processing apparatus configured to determine a presence of a defect based on information processing of the acoustic signal received via the receiving probe.

25. The honeycomb structure inspection apparatus according to claim 6,
wherein the honeycomb structure inspection apparatus is utilized as,
an inspection apparatus configured to conduct inspection of at least one of the internal shape and the external shape of the honeycomb structure during or after a manufacturing process of the honeycomb structure, or
an evaluation apparatus configured to conduct evaluation of a function of at least one of the honeycomb structure having a catalyst and the honeycomb structure not having a catalyst.

* * * * *